United States Patent Office 3,597,420
Patented Aug. 3, 1971

3,597,420
TERTIARY-AMINO-LOWER-ALKOXY-9-BENZYL-IDENE-XANTHENES AND THIOXANTHENES
Sydney Archer, Bethlehem, N.Y., assignor to Sterling Drug Inc., New York, N.Y.
No Drawing. Continuation of applications Ser. No. 698,399, Jan. 17, 1968, Ser. No. 615,058, Feb. 10, 1967, and Ser. No. 355,475, Mar. 27, 1964. This application Feb. 17, 1969, Ser. No. 799,915
Int. Cl. C07d 7/46, 65/16
U.S. Cl. 260—240TC
8 Claims

ABSTRACT OF THE DISCLOSURE

Lower-tertiary - amino - lower-alkoxy substituted xanthenes and thioxanthenes bearing in the 9-position a secondary or tertiary carbinol group, a benzylidene group or a benzyl group are prepared from the appropriate hydroxy substituted 9-xanthenones or 9-thioxanthenones. They have useful pharmacological properties, e.g., as anti-inflammatory, anti-secretory and anti-ulcerogenic agents.

---

This application is a continuation of my prior applications, Ser. Nos. 698,339, filed Jan. 17, 1968; 615,058, filed Feb. 10, 1967; and 355,475, filed Mar. 27, 1964, all now abandoned.

This invention relates to new xanthenes and thioxanthene derivatives and to processes for the preparation thereof.

One aspect of the invention is concerned with compounds wherein a xanthene or thioxanthene nucleus is substituted on an aromatic ring carbon by a lower-tertiary-amino-lower-alkoxy group and in the 9-position by a hydroxy group and by a group R wherein R is hydrogen, lower-alkyl, phenyl or phenyl-lower-alkyl. These compounds are represented by the following general formula:

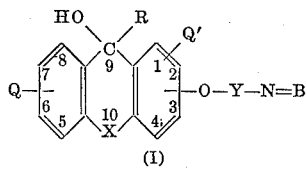

(I)

wherein —N=B is lower-tertiary-amino; Y is a lower-alkylene bridge having its connecting valences on different carbon atoms; R is hydrogen, lower-alkyl, monocarbocyclic aryl or monocarbocyclic aryl-lower-alkyl, wherein monocarbocyclic aryl is phenyl or phenyl substituted by from one to three groups selected from lower-alkyl, lower-alkoxy, lower-alkylthio, lower-alkylsulfinyl, lower-alkylsulfonyl, trifluoromethyl, trifluoromethoxy and halogen; X is O, S or SO₂; and Q and Q' represent hydrogen or from one to three groups selected from lower-alkyl, lower-alkoxy, lower-alkylthio, lower-alkylsulfinyl, lower-alkylsulfonyl, trifluoromethyl, trifluoromethoxy and halogen.

The lower-tertiary-amino-lower-alkoxy side chain can be attached to any one of the 1-, 2-, 3- or 4-positions of the xanthene or thioxanthene nucleus. The 2- and 3-positions are preferred since they are derived from readily available starting materials.

The term "lower-tertiary-amino" (—N=B in Formula I above) defines a radical of the type ZZ′N— wherein Z and Z′ are both organic radicals so that the complete molecule to which it is attached is a tertiary-amine. The lower-tertiary-amino radical is preferably basic and has a molecular weight less than about 200. Basic tertiary-amino radicals are those of the aliphatic or araliphatic type that impart to the molecules which contain them sufficient basicity (ionization to the extent of at least 10⁻⁶) so that the compounds readily form acid-addition salts with strong inorganic and organic acids. A particularly preferred group of tertiary-amino radicals are di-lower-alkylamino, for example, dimethylamino, diethylamino, dibutylamino, methylethylamino, and the like; dicycloalkylamino in which the cycloalkyl has from 5 to 6 ring members and a total of from five to about nine carbon atoms, for example, dicyclopentylamino, dicyclohexyl,-amino, bis(4-methylcyclohexyl)amino, and the like; N-(cycloalkyl)-lower-alkylamino in which the cycloalkyl has from 5 to 6 ring members and a total of from five to about nine carbon atoms, for example, N-(cyclohexyl) methylamino, N-(cyclopentyl)ethylamino, and the like; polymethylenimino having from 5 to 7 ring members and a total of from four to about nine carbon atoms, for example, 1-pyrrolidyl, 1-piperidyl, hexamethylenimino and lower-alkylated derivatives thereof; 4-morpholinyl; 1-piperazinyl; 4-hydrocarbon - substituted - 1 - piperazinyl in which the hydrocarbon substituent has from 1 to 10 carbon atoms, for example, 4-methyl-1-piperazinyl, 4-phenyl-1-piperazinyl, and the like; di-(phenyl-lower-alkyl)amino, for example, dibenzylamino, bis(phenylethyl)amino, and the like; and N-(phenyl-lower-alkyl)-lower-alkylamino, for example, N-(benzyl)methylamino, N-(phenylethyl) ethylamino, and the like. In the foregoing radicals, the term lower-alkyl stands for alkyl groups containing from one to about six carbon atoms.

The lower-alkylene bridge (Y in Formula I above) stands for an alkylene radical of at least two and not more than about five carbon atoms, including such radicals as $$-CH_2CH_2-, \quad -CH_2CH_2CH_2-$$
$$-CH(CH_3)CH_2-, \quad -CH(CH_3)CH(CH_3)-$$
$$-CH_2CH_2CH_2CH_2-, \quad -CH_2CH_2CH_2CH_2CH_2-$$

and the like.

In the definition of the group R in the 9-position, the term "lower-alkyl" refers to alkyl groups having from one to about six carbon atoms, including, for example, methyl, ethyl, propyl, isopropyl, butyl, hexyl, and the like.

In the substituents optionally present on the benzenoid rings (substituents of the group R or the radicals Q and Q′) the terms "lower-alkyl" and "lower-alkoxy" refer to such groups having from one up to and including six carbon atoms, including, for example, methyl, ethyl, propyl, isopropyl, butyl, tertiary-butyl, hexyl, methoxy, ethoxy, isopropoxy, hexoxy and the like. The halogen atoms can be any of the four halogens, fluorine, chlorine, bromine or iodine.

The compounds of Formula I wherein R is hydrogen are prepared by reacting a compound of the formula

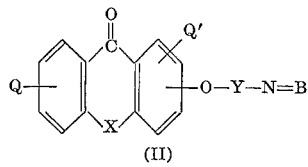

(II)

wherein N=B, Y, X, Q and Q' have the meanings given hereinabove with a metal hydride reducing agent, for example, lithium aluminum hydride. The compounds of Formula I wherein R is lower-alkyl, monocarbocyclic aryl or monocarbocyclic aryl-lower-alkyl are prepared by reacting a compound of Formula II with a Grignard reagent, R—Mg-halide or a lithium derivative, R—Li. The reaction takes place at ordinary temperatures in an anhydrous, inert, organic solvent to give an organometallic complex which, upon addition of water, is readily hydrolyzed to a tertiary-carbinol of Formula I.

The compounds of Formula II are in turn prepared from the appropriate hydroxy-9-xanthenone or hydroxy-9-thioxanthenone. The latter is converted to its sodium salt with a strong base such as an alkali metal lower-alkoxide, for example, sodium methoxide, and treated with a lower-tertiary-amino-lower-alkyl halide to yield a compound of Formula II. In the event it is desired to obtain compounds of Formula II wherein Y has a chain of four or five carbon atoms, an alternative procedure is preferably used whereby the hydroxy-9-xanthenone or 9-thioxanthenone is condensed with a bromo-lower-alkyl chloride,

and the resulting chloro-lower-alkoxy compound then reacted with a secondary amine HN=B.

The intermediate hydroxy-9-xanthenones are in turn prepared by known methods, for example, by interacting salicylic acid or a substituted salicylic acid with a dihydric phenol or substituted dihydric phenol followed by cyclization of the intermediate acetophenone derivative. Similarly, the intermediate hydroxy-9-thioxanthenones are prepared by known methods, for example by interacting o-mercaptobenzoic acid or a substituted o-mercaptobenzoic acid with a halogenated anisole or a substituted halogenated anisol, cyclizing the resulting diphenyl sulfide derivative and then demethylating the methyl ether grouping with phosphorus and hydriodic acid or with aluminum chloride.

Another aspect of the invention is concerned with compounds wherein a xanthene or thioxanthene ring nucleus is substituted on an aromatic ring carbon by a lower-tertiary-amino-lower-alkoxy group and in the 9-position by a monocarbocyclic arylidene group. These compounds are represented by the following general formula:

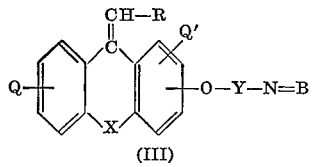

(III)

wherein N=B, Y, X, Q and Q' have the meanings given hereinabove and R is phenyl or phenyl substituted by from one to three groups selected from lower-alkyl, lower-alkoxy, lower-alkylthio, lower-alkylsulfinyl, lower-alkylsulfonyl, trifluoromethyl, trifluoromethoxy and halogen.

The compounds of Formula III are prepared by dehydration of the compounds of Formula I wherein R is monocarbocyclic arylmethyl. The dehydration is carried out by treating the latter with an acid, preferably a solution of a strong mineral acid in an organic solvent, for example, hydrochloric acid in ethanol.

Another aspect of the invention is concerned with compounds wherein a xanthene or thioxanthene ring nucleus is substituted on an aromatic ring carbon by a lower-tertiary-amino-lower-alkoxy group and in the 9-position by a monocarbocyclic arylmethyl group. These compounds are represented by the following general formula:

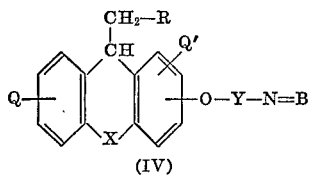

(IV)

wherein N=B, Y, X, Q and Q' have the meanings given hereinabove, and R is phenyl or phenyl substituted by from one to three groups selected from lower-alkyl, lower-alkoxy, lower-alkylthio, lower-alkylsulfinyl, lower-alkylsulfonyl, trifluoromethyl, trifluoromethoxy and halogen.

The compounds of Formula IV are prepared by catalytic hydrogenation of the compounds of Formula III. The hydrogenation can be carried out in the presence of a catalyst known to reduce olefinic double bonds. A preferred catalyst is palladium on carbon.

An alternative approach to the compounds of Formula IV involves reaction of a lower-alkoxy-9-xanthenone or -thioxanthenone with a benzylmagnesium halide to afford a lower-alkoxy-9-benzyl-9-xanthenol or -thioxanthenol, treatment of the latter with phosphorus and hydriodic acid to yield a hydroxy-9-benzylxanthene or -thioxanthene, and, finally, reaction with a lower-tertiary-amino-lower-alkyl halide in the presence of a strong base to yield a compound of Formula IV, as represented in the following flow sheet:

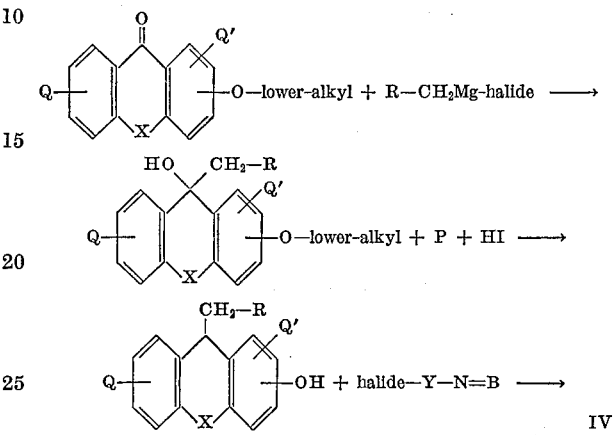

IV wherein Q and Q' have the meanings given hereinabove, and R is phenyl or phenyl substituted as indicated above.

A further aspect of the invention resides in novel intermediates of Formula II wherein N=B is 4-morpholinyl, 1-piperazinyl, 4-lower-alkyl-1-piperazinyl or 4-phenyl-1-piperazinyl; Y is a lower-alkylene bridge having its connecting valences on different carbon atoms, X is O, S or $SO_2$, and Q and Q' have the meanings given hereinabove.

The structures of the compounds of the invention were established by elementary analysis, by the modes of preparation and by ultraviolet and infrared spectra.

The compounds of the invention of Formulas I, II, III and IV are basic in nature and readily form acid-addition or quaternary ammonium salts. Said acid-addition and quaternary ammonium salts are within the purview of the invention and are the full equivalents of the free bases claimed herein.

It will thus be appreciated that Formulas I, II, III and IV not only represent the structural configuration of the bases of Formulas I, II, III and IV but are also representative of the respective structural entity which is common to all of the respective compounds of Formulas I, II, III and IV whether in the form of the free bases or in the form of the acid-addition or quaternary ammonium salts of the bases. By virtue of this common structural entity, the bases and their salts have inherent biological activity of a type to be more fully described hereinbelow. When used for pharmaceutical purposes one can employ the free bases themselves or the acid-addition or quaternary ammonium salts formed from pharmaceutically-acceptable acids or esters, that is, acids or esters whose anions are inocuous to the animal organism in effective doses of the salts so that beneficial properties inherent in the common structural entity represented by the free bases are not vitiated by side-effects ascribable to the anions.

In utilizing the pharmacodynamic activity of the salts of the invention, pharmaceutically-acceptable salts are preferred. Although water-insolublity, high toxicity, or lack of crystalline character may make some particular salt species unsuitable or less desirable for use as such in a given pharmaceutical application, the water-insoluble or toxic salts can be converted to any desired pharmaceutically-acceptable salt by double decomposition reactions involving the anion, for example, by ion-exchange procedures. Moreover, apart from their usefulness in pharmaceutical applications, the salts are useful as characterizing or identifying derivatives of the free bases or in isolation or purification procedures.

It will be appreciated from the foregoing that all of the acid-addition and quaternary ammonium salts of the new bases of the invention are useful and valuable compounds, regardless of considerations of solubility, toxicity, physical form, and the like, and are accordingly within the purview of the instant invention.

The novel feature of the compounds of the invention, then, resides in the concept of the bases and cationic forms of the basic compounds of Formulas I, II, III and IV and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids. Illustrative acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, cyclohexanesulfamic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the basic compounds of Formulas I, II, III and IV are obtained by the addition of esters of strong acids to the free base form of the compounds, said esters having a molecular weight less than about 300. A preferred class of esters comprises alkyl, alkenyl, and mono-carbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given application, the water-insoluble or toxic salts can be converted to the corresponding pharmaceutically-acceptable salts by double decomposition reactions involving the anion, for example, by ion-exchange procedures. Alternatively, if the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Pharmacological testing of the compounds of the invention of Formulas I, III and IV has demonstrated that they possess anti-inflammatory activity. A particular form of anti-inflammatory activity exhibited by the compounds of the invention is gastric anti-secretory and anti-ulcerogenic activity. They are therefore useful in preventing the formation of gastric ulcers in mammalian organisms.

The compounds of Formula I (where R is monocarbocyclic aryl-lower-alkyl), II and III are also useful as intermediates in preparing other compounds within the scope of the invention as is apparent from the preparative methods described above and the illustrative examples below.

The following examples will further illustrate the invention without the latter being limited thereby.

(A) 3 - (LOWER - TERTIARY - AMINO - LOWER - ALKOXY) - 9 - XANTHENONES AND 9 - THIO-XANTHENONES (II)

Example A1

3-(2-diethylaminoethoxy)-9-xanthenone.—A mixture of 21.2 g. (0.1 mole) of 3-hydroxy-9-xanthenone, 6.5 g. (0.12 mole) of sodium methoxide, 300 ml. of chlorobenzene and 25 ml. of methanol was heated at 130° C. until the methanol had distilled off. The mixture was cooled to 100° C., and 16.3 g. (0.12 mole) of 2-diethylaminoethyl chloride was added. The reaction mixture was refluxed for three and one-half hours, then cooled to 100° C., and 10 ml. of 35% sodium hydroxide in 200 ml. of water was added. The mixture was allowed to cool with stirring for one-half hour. The chlorobenzene layer was separated from the aqueous layer, and the latter was extracted twice with chloroform. The chloroform extracts were added to the chlorobenzene layer and the solution dried and concentrated in vacuo. The residue was dissolved in hexane with warming, the solution cooled and the product allowed to crystallize to give 29.6 g. of 3-(2-diethylaminoethoxy)-9-xanthenone, which, when recrystallized from hexane had the M.P. 63.2–64.2° C.

Example A2

3-(2-diethylaminoethoxy)-6-methyl-9-xanthenone was prepared from 3-hydroxy-6-methyl-9-xanthenone and 2-diethylaminoethyl chloride according to the procedure described above in Example A1. The product had the M.P. 64.0–65.4° C. when recrystallized from hexane.

Example A3

3-(2-dimethylaminoethoxy)-9-xanthenone was prepared from 3-hydroxy-9-xanthenone and 2-dimethylaminoethyl chloride according to the procedure described above in Example A1. The product was obtained in the form of colorless needles, M.P. 85.8–89.0° C. when recrystallized from hexane.

Example A4

3-[2-(1-piperidyl)ethoxy]-9-xanthenone was prepared from 3-hydroxy-9-xanthenone and 2-(1-piperidyl)ethyl chloride according to the procedure described above in Example A1. The product had the M.P. 85.4–87.0° C. when recrystallized from hexane.

Example A5

3-[2-(4-morpholinyl)ethoxy]-9-xanthenone was prepared from 3-hydroxy-9-xanthenone and 2-(4-morpholinyl)ethyl chloride according to the procedure described above in Example A1. The product had the M.P. 142.8–144.8° C. when recrystallized from ethyl acetate.

Example A6

3-[2-(1-pyrrolidyl)ethoxy]-9-xanthenone was prepared from 3-hydroxy-9-xanthenone and 2-(1-pyrrolidyl)ethyl chloride according to the procedure described above in Example A1. The product had the M.P. 107.4–110.0° C. when recrystallized from ethyl acetate.

Example A7

3-(3-dimethylaminopropoxy)-9-xanthenone was prepared from 3-hydroxy-9-xanthenone and 3-dimethylaminopropyl chloride according to the procedure described above in Example A1. The product had the M.P. 68.2–70.0° C. when recrystallized from hexane.

Example A8

3-[2-(N-ethylbenzylamino)ethoxy]-9-xanthenone was prepared from 3-hydroxy-9-xanthenone and 2-(N-ethylbenezylamino)ethyl chloride according to the procedure described above in Example A1. The product had the M.P. 40–45° C. when recrystallized from hexane. A sample of the free base was converted to its hydrochloride salt by dissolving it in ethanol and adding an excess of ethanolic hydrochloric acid. The hydrochloride salt was recrystallized from isopropyl alcohol and had the M.P. 179.4–180.2° C.

Example A9

3-[2-(4-methyl-1-piperazinyl)ethoxy]-9-xanthenone was was prepared from 3-hydroxy-9-xanthenone and 2-(4-methyl-1-piperazinyl)ethyl chloride according to the procedure described above in Example A1. The product had the M.P. 120.8–122.6° C. when recrystallized from an ethyl acetate-hexane mixture.

By replacing the 2-diethylaminoethyl chloride in Example A1 by a molar equivalent amount of 2-dicyclohexylaminoethyl chloride,
2-bis(4-methylcyclohexyl)aminoethyl chloride,
2-[N-(cyclopentyl)methylamino]ethyl chloride,
2-hexamethyleniminoethyl chloride,
2-dibenzylaminoethyl chloride,
2-dimethylamino-1-propyl chloride, or
2-dimethylamino-1,2-dimethylethyl chloride, there can be obtained, respectively, 3-(2-dicyclohexylaminoethoxy)-9-xanthenone;
3-[2-bis(4-methylcyclohexyl)amino-ethoxy]-9-xanthenone;
3-{2-[N-(cyclopentyl)methylamino]ethoxy}-9-xanthenone;
3-(2-hexamethyleniminoethoxy)-9-xanthenone;
3-(2-dibenzylaminoethoxy)-9-xanthenone;
3-(2-dimethylamino-1-propoxy)-9-xanthenone; or
3-(2-dimethylamino-1,2-dimethylethoxy)-9-xanthenone.

4-bromosalicylic acid,
3-butylsalicylic acid,
5-chlorosalicylic acid,
3-bromo-4,5-dimethylsalicylic acid,
3-bromo-4,6-dimethoxysalicylic acid,
3,5-dichlorosalicylic acid,
3,4-dimethoxysalicylic acid,
4-ethoxysalicylic acid,
3-fluorosalicylic acid,
4-hexyloxysalicylic acid,
3-iodosalicylic acid,
5-isopropylsalicylic acid,
4-trifluoromethylsalicylic acid,
4-trifluoromethoxysalicylic acid, or
5-ethylthiosalicylic acid can be caused to react with resorcinol in the presence of zinc chloride and phosphorus oxychloride, and the resulting substituted salicoyl resorcinol cyclized by heating to give, respectively, 3-hydroxy-6-bromo-9-xanthenone,
3-hydroxy-5-butyl-9-xanthenone,
3-hydroxy-7-chloro-9-xanthenone,
3-hydroxy-5-bromo-6,7-dimethyl-9-xanthenone,
3-hydroxy-5-bromo-6,8-dimethoxy-9-xanthenone,
3-hydroxy-5,7-dichloro-9-xanthenone,
3-hydroxy-5,6-dimethoxy-9-xanthenone,
3-hydroxy-6-ethoxy-9-xanthenone,
3-hydroxy-5-fluoro-9-xanthenone,
3-hydroxy-6-hexyloxy-9-xanthenone,
3-hydroxy-5-iodo-9-xanthenone,
3-hydroxy-7-isopropyl-9-xanthenone,
3-hydroxy-6-trifluoromethyl-9-xanthenone,
3-hydroxy-6-trifluoromethoxy-9-xanthenone, or
3-hydroxy-7-ethylthio-9-xanthenone.

The starting substituted salicylic acids are readily prepared by the well-known Kolbe-Schmitt reaction from the corresponding phenols.

By replacing the 3-hydroxy-9-xanthenone in Example A1 by a molar equivalent amount of 1-hydroxy-9-xanthenone,
3-hydroxy-6-bromo-9-xanthenone,
3-hydroxy-5-butyl-9-xanthenone,
3-hydroxy-7-chloro-9-xanthenone,
3-hydroxy-5-bromo-6,7-dimethyl-9-xanthenone,
3-hydroxy-5-bromo-6,8-dimethoxy-9-xanthenone,
3-hydroxy-5,7-dichloro-9-xanthenone,
3-hydroxy-5,6-dimethoxy-9-xanthenone,
3-hydroxy-6-ethoxy-9-xanthenone,
3-hydroxy-6-fluoro-9-xanthenone,
3-hydroxy-6-hexyloxy-9-xanthenone,
3-hydroxy-5-iodo-9-xanthenone,
3-hydroxy-7-isopropyl-9-xanthenone,
3-hydroxy-6-trifluoromethyl-9-xanthenone,
3-hydroxy-6-trifluoromethoxy-9-xanthenone, or
3-hydroxy-7-ethylthio-9-xanthenone, there can be obtained, respectively, 1-(2-diethylaminoethoxy)-9-xanthenone;
3-(2-diethylaminoethoxy)-6-bromo-9-xanthenone;
3-(2-diethylaminoethoxy)-5-butyl-9-xanthenone;
3-(2-diethylaminoethoxy)-7-chloro-9-xanthenone;
3-(2-diethylaminoethoxy)-5-bromo-6,7-dimethyl-9-xanthenone;
3-(2-diethylaminoethoxy)-5-bromo-6,8-dimethoxy-9-xanthenone;
3-(2-diethylaminoethoxy)-5,7-dichloro-9-xanthenone;
3-(2-diethylaminoethoxy)-5,6-dimethoxy-9-xanthenone;
3-(2-diethylaminoethoxy)-6-ethoxy-9-xanthenone;
3-(2-diethylaminoethoxy)-5-fluoro-9-xanthenone;
3-(2-diethylaminoethoxy)-6-hexyloxy-9-xanthenone;
3-(2-diethylaminoethoxy)-5-iodo-9-xanthenone;
3-(2-diethylaminoethoxy)-7-isopropyl-9-xanthenone;
3-(2-diethylaminoethoxy)-6-trifluoromethyl-9-xanthenone;
3-(2-diethylaminoethoxy)-6-trifluoromethoxy-9-xanthenone; or
3-(2-diethylaminoethoxy)-7-ethylthio-9-xanthenone.

3-(2-diethylaminoethoxy)-7-ethylthio-9-xanthenone can be oxidized with hydrogen peroxide to give first 3-(2-diethylaminoethoxy)-7-ethylsulfinyl-9-xanthenone and then 3-(2-diethylaminoethoxy)-7-ethylsulfonyl-9-xanthenone.

Example A10

3-(2-dimethylaminoethoxy)-9-thioxanthenone was prepared from 3-hydroxy-9-thioxanthenone and 2-dimethylaminoethyl chloride according to the procedure described above in Example A1. The product had the M.P. 67.0–68.8° C. when recrystallized from a benzene-hexane mixture.

The intermediate 3-hydroxy-9-thioxanthenone, M.P. 275–280° C. was prepared by reacting o-mercaptobenzoic acid and m-iodoanisole, cyclization of the resulting subsituted diphenyl sulfide to 3-methoxy-9-thioxanthenone and demethylation with aluminum chloride.

3-(2-dimethylaminoethoxy)-9-thioxanthenone was obtained in the form of its benzyl chloride quaternary salt, M.P. 198.0–199.0° C., recrystallized from isopropyl alcohol-ether, by reacting the free base with benzyl chloride in acetonitrile solution.

Example A11

3-[2-(1-piperidyl)ethoxy]-9-thioxanthenone was prepared from 3-hydroxy-9-thioxantheneone and 2-(1-piperidyl)ethyl chloride according to the procedure described above in Example A1. The product had the M.P. 97.0–99.8° C. when recrystallized from a benzene-hexane mixture.

Example A12

3-(3-dimethylaminopropoxy) - 9-thioxanthenone was prepared from 3-hydroxy-9-thioxanthenone and 3-dimethylaminopropyl chloride according to the procedure described above in Example A1. The product had the M.P. 89.0–92.0° C. when recrystallized from aqueous ethanol.

Example A13

3-[2-(4-morpholinyl)ethoxy]-9 - thioxanthenone was prepared from 3-hydroxy-9-thioxanthenone and 2-(4-morpholinyl)ethyl chloride according to the procedure described above in Example A1. The product had the M.P. 144.0–148.0° C. when recrystallized from a benzene-pentane mixture.

Example A14

3-[2-(1-pyrrolidyl)ethoxy]-9-thioxanthenone was prepared from 3-hydroxy-9-thioxanthenone and 2-(1-pyrrolidyl)ethyl chloride according to the procedure described above in Example A1. The product had the M.P. 97.0–99.6° C. when recrystallized from a benzene-hexane mixture.

Example A15

2-[2-(1-piperidyl)ethoxy]-9-thioxanthenone was prepared from 2-hydroxy-9-thioxanthenone and 2-(1-piperidyl)ethyl chloride according to the procedure described above in Example A1. The product had the M.P. 96.0–97.0° C. when recrystallized from a benzene-pentane mixture.

The intermediate 2-hydroxy-9-thioxanthenone was prepared by condensing o-mercaptobenzoic acid and phenol in the presence of sulfuric acid.

Example A16

3-[2-(4-methyl-1 - piperazinyl)ethoxy] - 9-thioxanthenone was prepared from 3-hydroxy-9-thioxanthenone and 2-(4-methyl-1-piperazinyl)ethyl chloride according to the procedure described above in Example A1. The product had the M.P. 106–111° C. when recrystallized from cyclohexane.

Example A17

3-[2-(4-phenyl-1-piperazinyl)ethoxy]-9-thioxanthenone was prepared from 3-hydroxy-9-thioxanthenone and 2-(4-phenyl-1-piperazinyl)ethyl chloride according to the procedure described above in Example A1. The product had the M.P. 141–148° C. when recrystallized from a benzene-pentane mixture.

Example A18

2-(2-dimethylaminoethoxy)-9-thioxanthenone was prepared from 2-hydroxy-9-thioxanthenone and 2-dimethylaminoethyl chloride according to the procedure described above in Example A1. The product had the M.P. 50–53° C. when recrystallized from a benzene-pentane mixture.

Example A19

3-(3-diethylaminopropoxy)-9-thioxanthenone was prepared from 3-hydroxy-9-thioxanthenone and 3-diethylaminopropyl chloride according to the procedure described above in Example A1. The product had the M.P. 55–56° C. when recrystallized from a benzene-pentane mixture.

Example A20

3-(2-diethylaminoethoxy)-9-thioxanthenone was prepared from 3-hydroxy-9-thioxanthenone and 2-diethylaminoethyl chloride according to the procedure described above in Example A1. The product was obtained in the form of its hydrochloride salt and had the M.P. 207–212° C. when recrystallized from an isopropyl alcohol-ether mixture.

Example A21

3-(3-dimethylamino - 2 - methylpropoxy)-9-thioxanthenone was prepared from 3-hydroxy-9-thioxanthenone and 3-dimethylamino-2-methylpropyl chloride according to the procedure described above in Example A1. The product had the M.P. 72.5–75.5° C. when recrystallized from a benzene-pentane mixture.

Example A22

(a) 3 - (4-chlorobutoxy)-9-thioxanthenone was prepared from 3-hydroxy-9-thioxanthenone and 4-bromopropyl chloride according to the procedure described above in Example A1. The product had the M.P. 119–124° C. when recrystallized from ethanol.

(b) 3-(4 - dimethylaminobutoxy)-9-thioxanthenone.— A mixture of 3.6 g. of 3-(4-chlorobutoxy)-9-thioxanthenone and 36 g. of 25% dimethylamine in water was refluxed for 32 hours. The reaction mixture was poured into water, 10 ml. of 35% sodium hydroxide added, and the mixture extracted with ether. The ether extracts were dried and concentrated, and the residue was dissolved in acetone. An excess of alcoholic hydrogen chloride was added, the solution diluted with ether and the product collected by filtration, affording 3-(4-dimethylaminobutoxy)-9-thioxanthenone in the form of its hydrochloride salt, M.P. 226–230° C. when recrystallized from an ethanol-ether mixture.

By the procedure described in Example A1, 3-hydroxy-9-thioxanthenone-10,10-dioxide (prepared by reacting 3-hydroxy-9-thioxanthenone with hydrogen peroxide in acetic acid solution) or 4-hydroxy-1-methyl-9-thioxanthenone-10,10-dioxide can be caused to react with 3-dimethylaminopropyl chloride to give, respectively, 3-(3-dimethylaminopropoxy)-9-thioxanthenone-10,10-dioxide or 4-(3-dimethylaminopropoxy) - 1 - methyl - 9 - thioxanthenone-10,10-dioxide.

Example A23

2-(3-dimethylaminopropoxy) - 9 - thioxanthenone was prepared from 2-hydroxy-9-thioxanthenone and 3-dimethylaminopropyl chloride according to the procedure described above in Example A1, and was obtained in the form of a yellow solid, M.P. 68–70° C., when recrystallized from benzene-hexane.

By the procedure described in Example A1, 1-hydroxy-2,4-dimethyl-9-thioxanthenone,
1-hydroxy-2,3,4-trimethyl-9-thioxanthenone,
1-hydroxy-4-methoxy-9-thioxanthenone,
4-hydroxy-1-methyl-9-thioxanthenone,
8-bromo-2-hydroxy-5-methyl-9-thioxanthenone,
1-tertiary-butyl-4-hydroxy-9-thioxanthenone,
1-chloro-4-hydroxy-2-methyl-9-thioxanthenone,
1-chloro-4-hydroxy-9-thioxanthenone, or
2-hydroxy-8-methoxy-9-thioxanthenone can be caused to react with 3-dimethylaminopropyl chloride to give, respectively, 1-(3-dimethylaminopropoxy)-2,4-dimethyl-9-thioxanthenone;

1-(3-dimethylaminopropoxy)-2,3,4-trimethyl-9-
  thioxanthenone;
1-(3-dimethylaminopropoxy)-4-methoxy-9-
  thioxanthenone;
4-(3-dimethylaminopropoxy)-1-methyl-9-thioxanthenone;
2-(3-dimethylaminopropoxy)-5-methyl-8-bromo-9-
  thioxanthenone;
4-(3-dimethylaminopropoxy)-1-tertiary-butyl-9-
  thioxanthenone;
4-(3-dimethylaminopropoxy)-1-chloro-2-methyl-9-
  thioxanthenone;
4-(3-dimethylaminopropoxy)-1-chloro-9-thioxanthenone;
  or
2-(3-dimethylaminopropoxy)-8-methoxy-9-
  thioxanthenone.

(B) 3-(LOWER-TERTIARY-AMINO - LOWER - ALKOXY)-9-HYDROXY-9-R-XANTHENES AND -THIOXANTHENES (I)

Example B1

3-(2-diethylaminoethoxy) - 9 - benzyl - 9 xanthenol.—
Magnesium turnings (1.1 g., 0.044 gram atom) under 5 ml. of ether was treated with a few drops of benzyl chloride and reaction was initiated by crushing the magnesium with a stirring rod. Benzyl chloride (5.1 g., 0.04 mole) in 30 ml. of ether was then added over a period of ten minutes with stirring. The mixture was refluxed for twenty minutes, cooled and 6.22 g. (0.02 mole) of 3-(2-diethylaminoethoxy)-9-xanthenone (Example A1) in 50 ml. of ether was added. The reaction mixture was stirred at reflux for three hours. It was then cooled in an ice bath, ice cautiously added with shaking, and the mixture filtered. The filtrate was dried and concentrated in vacuo, and the residue recrystallized from hexane to give 3-(2-diethylaminoethoxy)-9-benzyl-9-xanthenol, M.P. 91.6–93.4° C.

Example B2

3-(2-diethylaminoethoxy) - 9 - (4 - methoxybenzyl) - 9-xanthenol was prepared from anisylmagnesium chloride and 3-(2-diethylaminoethoxy)-9-xanthenone (Example A1) according to the procedure described above in Example B1. The product had the M.P. 96.6–98.2° C. when recrystallized from a benzene-hexane mixture; ultraviolet maxima at 273, 283 and 290 mµ (ε=4900, 4400 and 3300).

Example B3

3-(2-diethylaminoethoxy) - 9 - (4-chlorobenzyl)-9-xanthenol was prepared from 4-chlorobenzylmagnesium chloride and 3-(2-diethylaminoethoxy)-9-xanthenone (Example A1) according to the procedure described above in Example B1. The pure compound was not isolated but was used directly in the dehydration reaction, Example C2 below.

Example B4

3-(2-diethylaminoethoxy)-6 - methyl - 9 - benzyl-9-xanthenol was prepared from benzylmagnesium chloride and 3-(2-diethylaminoethoxy)-6-methyl-9-xanthenone (Example A2) according to the procedure described above in Example B1. The product had the M.P. 105.4–107.0° C. when recrystallized from hexane.

Example B5

3-(2-diethylaminoethoxy)-6-methyl - 9 - (4 - chlorobenzyl)-9-xanthenol was prepared from 4-chlorobenzylmagnesium chloride and 3-(2-diethylaminoethoxy)-6-methyl-9-xanthenone (Example A2) according to the procedure described above in Example B1. The product had the M.P. 110.0–112.6° C. when recrystallized from a benzene-hexane mixture.

Example B6

3-(2 - diethylaminoethoxy) - 6 - methyl-9-(4-fluorobenzyl)-9-xanthenol was prepared from 4-fluorobenzylmagnesium chloride and 3-(2-diethylaminoethoxy)-6-methyl-9-xanthenone (Example A2) according to the procedure described above in Example B1. The product had the M.P. 97.7–104.7° C. when recrystallized from hexane.

Example B7

3-(2-diethylaminoethoxy) - 6 - methyl-9-(4-methylbenzyl)-9-xanthenol was prepared from 4-methylbenzylmagnesium bromide and 3-(2-diethylaminoethoxy)-6-methyl-9-xanthenone (Example A2) according to the procedure described above in Example B1. The product had the M.P. 129.8–132.8° C. when recrystallized from an ethyl acetate-hexane mixture.

Example B8

3-(2-diethylaminoethoxy)-6-methyl-9-(2-chlorobenzyl)-9-xanthenol was prepared from 2-chlorobenzylmagnesium chloride and 3-(2-diethylaminoethoxy)-6-methyl-9-xanthenone (Example A2) according to the procedure described above in Example B1. The product had the M.P. 86.2–92.4° C. when recrystallized from hexane.

Example B9

3-(2-diethylaminoethoxy)-6-methyl-9-(3-chlorobenzyl)-9-xanthenol was prepared from 3-chlorobenzylmagnesium chloride and 3-(2-diethylaminoethoxy) - 6 - methyl-9-xanthenone (Example A2) according to the procedure described above in Example B1. The product was obtained in the form of a gum which was dehydrated directly as described in Example C8 below.

Example B10

3-(2-diethylaminoethoxy)-6-methyl-9-(4-bromobenzyl)-9-xanthenol was prepared from 4-bromobenzylmagnesium chloride and 3-(2-diethylaminoethoxy) - 6 - methyl-9-xanthenone (Example A2) according to the procedure described above in Example B1. The product was obtained in the form of a gum which was dehydrated directly as described in Example C9 below.

By replacing the 3-(2-diethylaminoethoxy)-9-xanthenone in Example B1 above by a molar equivalent amount of 3-(2-dimethylaminoethoxy)-9-xanthenone (Example A3),
3-[2-(1-piperidyl)ethoxy]-9-xanthenone (Example A4),
3-[2-(4-morpholinyl)ethoxy]-9-xanthenone (Example A5),
3-[2-(1-pyrrolidyl)ethoxy]-9-xanthenone (Example A6),
3-(3-dimethylaminopropoxy)-9-xanthenone (Example A7),
3-[2-(N-ethylbenzylamino)ethoxy]-9-xanthenone (Example A8), or
3-[2-(4-methyl-1-piperazinyl)ethoxy]-9-xanthenone (Example A9) there can be obtained, respectively,
3-(2-dimethylaminoethoxy)-9-benzyl-9-xanthenol;
3-[2-(1-piperidyl)ethoxy]-9-benzyl-9-xanthenol;
3-[2-(4-morpholinyl)ethoxy]-9-benzyl-9-xanthenol;
3-[2-(1-pyrrolidyl)ethoxy]-9-benzyl-9-xanthenol;
3-(3-dimethylaminopropoxy)-9-benzyl-9-xanthenol;
3-[2-(N-ethylbenzylamino)ethoxy]-9-benzyl-9-xanthenol;
or 3-[2-(4-methyl-1-piperazinyl)ethoxy]-9-benzyl-9-xanthenol.

By replacing the 3-(2-diethylaminoethoxy)-9-xanthenone in Example B1 by a molar equivalent amount of 3-(2-dicyclohexylaminoethoxy)-9-xanthenone,
3-[2-bis(4-methylcyclohexyl)aminoethoxy]-9-xanthenone,
3-{2-[N-(cyclopentyl)methylamino]ethoxy-}-9-xanthenone,
3-(2-hexamethyleniminoethoxy)-9-xanthenone,
3-(2-dibenzylaminoethoxy)-9-xanthenone, 3-(2-dimethylamino-1-propoxy)-9-xanthenone, or
3-(2-dimethylamino-1,2-dimethylethoxy)-9-xanthenone there can be obtained, respectively, 3-(2-dicyclohexylaminoethoxy)-9-benzyl-9-xanthenol;
3-[2-bis(4-methylcyclohexyl)aminoethoxy]-9-benzyl-9-xanthenol;
3-{2-[N-(cyclopentyl)methylamino]ethoxy}-9-benzyl-9-xanthenol;
3-(2-hexamethyleniminoethoxy)-9-benzyl-9-xanthenol;
3-(2-dibenzylaminoethoxy)-9-benzyl-9-xanthenol;
3-(2-dimethylamino-1-propoxy)-9-benzyl-9-xanthenol; or
3-(2-dimethylamino-1,2-dimethylethoxy)-9-benzyl-9-xanthenol.

By replacing the 3-(2-diethylaminoethoxy) - 9 - xanthenone in Example B1 by a molar equivalent amount of 3-(2-diethylaminoethoxy)-6-bromo-9-xanthenone,
3-(2-diethylaminoethoxy)-5-butyl-9-xanthenone,
3-(2-diethylaminoethoxy)-7-chloro-9-xanthenone,
3-(2-diethylaminoethoxy)-5-bromo-6,7-dimethyl-9-xanthenone,
3-(2-diethylaminoethoxy)-5-bromo-6,8-dimethoxy-9-xanthenone,
3-(2-diethylaminoethoxy)-5,7-dichloro-9-xanthenone,
3-(2-diethylaminoethoxy)-5,6-dimethoxy-9-xanthenone,
3-(2-diethylaminoethoxy)-6-ethoxy-9-xanthenone,
3-(2-diethylaminoethoxy)-5-fluoro-9-xanthenone,
3-(2-diethylaminoethoxy)-6-hexyloxy-9-xanthenone,
3-(2-diethylaminoethoxy)-5-iodo-9-xanthenone,
3-(2-diethylaminoethoxy)-7-isopropyl-9-xanthenone,
3-(2-diethylaminoethoxy)-6-trifluoromethyl-9-xanthenone,
3-(2-diethylaminoethoxy)-6-trifluoromethoxy-9-xanthenone, or
3-(2-diethylaminoethoxy)-7-ethylthio-9-xanthenone there can be obtained, respectively, 1-(2-diethylaminoethoxy)-9-benzyl-9-xanthenol;
3-(2-diethylaminoethoxy)-6-bromo-9-benzyl-9-xanthenol;
3-(2-diethylaminoethoxy)-5-butyl-9-benzyl-9-xanthenol;
3-(2-diethylaminoethoxy)-7-chloro-9-benzyl-9-xanthenol;
3-(2-diethylaminoethoxy)-5-bromo-6,7-dimethyl-9-benzyl-9-xanthenol;
3-(2-diethylaminoethoxy)-5-bromo-6,8-dimethoxy-9-benzyl-9-xanthenol;
3-(2-diethylaminoethoxy)-5,7-dichloro-9-benzyl-9-xanthenol;
3-(2-diethylaminoethoxy)-5,6-dimethoxy-9-benzyl-9-xanthenol;
3-(2-diethylaminoethoxy)-6-ethoxy-9-benzyl-9-xanthenol;
3-(2-diethylaminoethoxy)-5-fluoro-9-benzyl-9-xanthenol;
3-(2-diethylaminoethoxy)-6-hexyloxy-9-benzyl-9-xanthenol;
3-(2-diethylaminoethoxy)-7-isopropyl-9-benzyl-9-xanthenol;
3-(2-diethylaminoethoxy)-6-trifluoromethyl-9-benzyl-9-xanthenol;
3-(2-diethylaminoethoxy)-5-iodo-9-benzyl-9-xanthenol;
3-(2-diethylaminoethoxy)-6-trifluoromethoxy-9-benzyl-9-xanthenol; or 3-(2 - diethylaminoethoxy) - 7 - ethylthio-9-benzyl-9-xanthenol can be oxidized with hydrogen peroxide to give first 3-(2-diethylaminoethoxy)-7-ethylsulfinyl - 9 - benzyl-9-xanthenol and then 3-(2-diethylaminoethoxy)-7-ethylsulfonyl-9-benzyl-9-xanthenol.

By replacing the benzyl chloride in Example B1 by a molar equivalent amount of 4-iodobenzyl chloride, 4-methylthiobenzyl chloride, 3,4,5-trimethoxybenzyl chloride, 4-trifluoromethylbenzyl chloride, 4-trifluoromethoxybenzyl chloride, or 3-chloro-4-methoxybenzyl chloride there can be obtained, respectively, 3-(2-diethylaminoethoxy)-9-(4-iodobenzyl)-9-xanthenol;
3-(2-diethylaminoethoxy)-9-(4-methylthiobenzyl)-9-xanthenol;
3-(2-diethylaminoethoxy)-9-(3,4,5-trimethoxybenzyl)-9-xanthenol;
3-(2-diethylaminoethoxy)-9-(4-trifluoromethylbenzyl)-9-xanthenol;
3-(2-diethylaminoethoxy)-9-(4-trifluoromethoxybenzyl)-9-xanthenol; or
3-(2-diethylaminoethoxy)-9-(3-chloro-4-methoxybenzyl)-9-xanthenol.

3-(2-diethylaminoethoxy) - 9 - (4-methylthiobenzyl)-9-xanthenol can be oxidized with hydrogen peroxide to give first 3-(2-diethylaminoethoxy) - 9 - (4 - methylsulfinylbenzyl) - 9 - xanthenol and then 3-(2-diethylaminoethoxy-9-(4-methylsulfonylbenzyl)-9-xanthenol.

Example B11

3-(2 - dimethylaminoethoxy)-9-benzyl-9-thioxanthenol was prepared from benzylmagnesium chloride and 3-(2-dimethylaminoethoxy)-9-thioxanthenone (Example A10) according to the procedure described above in Example B1. The product had the M.P. 106.0–108.6° C. when recrystallized from a benzene-hexane mixture.

Example B12

3-(2-dimethylaminoethoxy) - 9 - ethyl-9-thioxanthenol was prepared from ethylmagnesium bromide and 3-(2-dimethylaminoethoxy)-9-thioxanthenone (Example A10) according to the procedure described above in Example B1. The product had the M.P. 105.0–111.8° C. when recrystallized from benzene.

Example B13

3 - [2 - (1 - piperidyl)ethoxy] - 9 - (p-chlorobenzyl-9-thioxanthenol was prepared from p-chlorobenzylmagnesium chloride and 3 - [2 - (1 - piperidyl)ethoxy] - 9-thioxanthenone (Example A11) according to the procedure described above in Example B1. The product had the M.P. 76.0–86.0° C. When recrystallized from a benzene-pentane mixture.

Example B14

3 - (2 - diethylaminoethoxy) - 9 - benzyl-9-thioxanthenol was prepared from benzylmagnesium chloride and 3-(2-diethylaminoethoxy) - 9 - thioxanthenone (Example A20) according to the procedure described above in Example B1. The product had the M.P. 96–98° C. when recrystallized from a benzene-pentane mixture.

Example B15

2 - (2 - dimethylaminoethoxy) - 9 - benzyl - 9 - thioxanthenol was prepared from benzylmagnesium chloride and 2 - (2 - dimethylaminoethoxy) - 9 - thioxanthenone (Example A18) according to the procedure described above in Example B1. The product had the M.P. 104–106° C. when recrystallized from a benzene-hexane mixture.

Example B16

3 - [2 - (4 - methyl - 1 - piperazinyl)ethoxy]-9-benzyl-9-thioxanthenol was prepared from benzylmagnesium chloride and 3 - [2 - (4 - methyl-1-piperazinyl)ethoxy]-9-thioxanthenone (Example A16) according to the procedure described above in Example B1. The product had the M.P. 140.5–141.5° C. when recrystallized from a benzene-pentane mixture.

Example B17

3 - [2 - (1-pyrrolidyl)ethoxy]-9-benzyl-9-thioxanthenol was prepared from benzylmagnesium chloride and 3-[2-(1-pyrrolidyl)ethoxy]-9-thioxanthenone (Example A14) according to the procedure described above in Example B1. The product had the M.P. 145.5–149.5° C. when recrystallized from cyclohexane.

Example B18

3-(2-diethylaminoethoxy)-9-(p-chlorobenzyl)-9-thioxanthenol was prepared from p-chlorobenzylmagnesium chloride and 3-(2-diethylaminoethoxy)-9-thioxanthenone (Example A20) according to the procedure described above in Example B1. The product had the M.P. 92.5–94.5° C. when chromatographed on activated magnesium silicate, eluted with benzene-ether and recrystallized from an ether-hexane mixture.

Example B19

3-(3-diethylaminopropoxy)-9-benzyl-9-thioxanthenol was prepared from benzylmagnesium chloride and 3-(3-diethylaminopropoxy)-9-thioxanthenone (Example A19) according to the procedure described above in Example B1. The product had the M.P. 139–143° C. when recrystallized from a benzene-pentane mixture.

Example B20

3-(2-diethylaminoethoxy)-9-(p-methylbenzyl)-9-thioxanthenol was prepared from p-methylbenzylmagnesium chloride and 3-(2-diethylaminoethoxy)-9-thioxanthenone (Example A20) according to the procedure described above in Example B1. The product had the M.P. 95–101° C. when recrystallized from a benzene-pentane mixture.

Example B21

3-(2-diethylaminoethoxy)-9-(p-fluorobenzyl)-9-thioxanthenol was prepared from p-fluorobenzylmagnesium chloride and 3-(2-diethylaminoethoxy)-9-thioxanthenone (Example A20) according to the procedure described above in Example B1. The product had the M.P. 80.5–85.5° C. when recrystallized from a benzene-hexane mixture.

According to the procedure of Example B1, benzylmagnesium chloride reacts with 3-(3-dimethylaminopropoxy)-9-thioxanthenone (Example A12),
3-[2-(4-morpholinyl)ethoxy]-9-thioxanthenone (Example A13),
2-[2-(1-piperidyl)ethoxy]-9-thioxanthenone (Example A15),
3-[2-(4-phenyl-1-piperazinyl)ethoxy]-9-thioxanthenone (Example A17),
3-(3-dimethylamino-2-methylpropoxy)-9-thioxanthenone (Example A21),
3-(4-dimethylaminobutoxy)-9-thioxanthenone (Example A22),
3-(3-dimethylaminopropoxy)-9-thioxanthenone-10,10-dioxide or
4-(3-dimethylaminopropoxy)-1-methyl-9-thioxanthenone-10,10-dioxide to give, respectively, 3-(3-dimethylaminopropoxy)-9-benzyl-9-thioxanthenol,
3-[2-(4-morpholinyl)ethoxy]-9-benzyl-9-thioxanthenol,
2-[2-(1-piperidyl)ethoxy]-9-benzyl-9-thioxanthenol,
3-[2-(4-phenyl-1-piperazinyl)ethoxy]-9-benzyl-9-thioxanthenol,
3-(3-dimethylamino-2-methylpropoxy)-9-benzyl-9-thioxanthenol,
3-(4-dimethylaminobutoxy)-9-benzyl-9-thioxanthenol,
3-(3-dimethylaminopropoxy)-9-benzyl-9-thioxanthenol-10,10-dioxide or
4-(3-dimethylaminopropoxy)-1-methyl-9-benzyl-9-thioxanthenol-10,10-dioxide.

Example B22

3-(2-dimethylaminoethoxy)-9-thioxanthenol.—To a mixture of 0.76 g. of lithium aluminum hydride and 20 ml. of tetrahydrofuran was added 5.9 g. of 3-(2-dimethylaminoethoxy)-9-thioxanthenone (Example A10) in 100 ml. of tetrahydrofuran over a period of 30 minutes. The reaction mixture was stirred for three and one-half hours. Ether (20 ml.) and water (2 ml.) were then added, and the mixture was filtered and the filter cake washed with methylene dichloride. The combined filtrates and washings were concentrated to remove the solvent, and the residue was crystallized from benzene-hexane to give 6.03 g. of 3-(2-dimethylaminoethoxy)-9-thioxanthenol, M.P. 125.4–127.6° C. when recrystallized from benzene-hexane.

Example B23

3-[2-(1-piperidyl)ethoxy]-9-thioxanthenol was prepared by lithium aluminum hydride reduction of 3-[2-(1-piperidyl)ethoxy]-9-thioxanthenone (Example A11) according to the procedure of Example B22. The product had the M.P. 114.0–115.6° C. when recrystallized from benzene-pentane.

Example B24

2-(2-dimethylaminoethoxy)-9-thioxanthenol was prepared by lithium aluminum hydride reduction of 2-(2-dimethylaminoethoxy)-9-thioxanthenone (Example A18) according to the procedure of Example B22. The product had the M.P. 109–111.5° C. when recrystallized from benzene-pentane.

Example B25

3-(3-dimethylaminopropoxy)-9-thioxanthenol was prepared by lithium aluminum hydride reduction of 3-(3-dimethylaminopropoxy)-9-thioxanthenone (Example A12) according to the procedure of Example B22. The product was treated with hydrogen chloride gas in acetone solution and obtained in the form of its hydrochloride salt, M.P. 197–201° C. when recrystallized from ether.

Example B26

3-(3-dimethylaminopropoxy)-9-phenyl-9-thioxanthenol.—A solution of 3.13 g. of 3-(3-dimethylaminopropoxy)-9-thioxanthenone (Example A12) in 40 ml. of benzene was added over a 30 minute period to 28 ml. of a 1.05 M phenyllithium solution in ether. The reaction mixture was refluxed for five hours, then cooled in an ice bath and 20 ml. of water was added. The layers were separated, the aqueous layer extracted with benzene and with chloroform, and the combined organic layers dried and concentrated to remove the solvent. The residue was crystallized from benzene-hexane to give 3.4 g. of 3-(3-dimethylaminopropoxy)-9-phenyl-9-thioxanthenol, M.P. 133.5–138.5° C. when recrystallized from benzene-hexane.

Example B27

2-(3-dimethylaminopropoxy)-9-thioxanthenol.—A solution of 329 g. of 2-(3-dimethylaminopropoxy)-9-thioxanthenone (Example A23) in 3 liters of tetrahydrofuran was added over a one-hour period to a suspension of 42 g. of lithium aluminum hydride in 2 liters of tetrahydrofuran under a nitrogen atmosphere. The reaction mixture was stirred for three hours at room temperature, then cooled, purged with nitrogen, and the excess lithium aluminum hydride destroyed with 224 ml. of water. The mixture was filtered, the filter cake washed with 1 liter of hot tetrahydrofuran and 2 liters of hot methylene dichloride. The combined filtrate and washings was concentrated to remove all solvent, and the residue was taken up in 1 liter of hot benzene, stirred, and diluted with 1 liter of hexane. The resulting slurry was slowly cooled to 3° C. and filtered. The crystals were washed with 1 liter of cold 1:1 benzene-hexane and dried in a 60° C. vacuum oven for four hours to give 293 g. of 2-(3-dimethylaminopropoxy)-9-thioxanthenol in the form of tan crystals, M.P. 118–119° C.

Example B28

2-(3-dimethylaminopropoxy)-9-benzyl-9-thioxanthenol was prepared from 2-(3-dimethylaminopropoxy)-9-thioxanthenone (Example A23) and benzylmagnesium chloride according to the procedure of Example B1, and was obtained in the form of a colorless solid, M.P. 140.5–144.5° C. when recrystallized from benzene-hexane.

Example B29

3-(3-dimethylaminopropoxy) - 9 - methyl - 9 - thioxanthenol was prepared from 3-(3-dimethylaminopropoxy)-9-thioxanthenone (Example A12) and methyllithium according to the procedure of Example B26, and was obtained in the form of a colorless solid, M.P. 118–120° C. when recrystallized from benzene.

By the procedure described in Example B1, 1-(3-dimethylaminopropoxy)-2,4-dimethyl-9-thioxanthenone,
1-(3-dimethylaminopropoxy)-2,3,4-trimethyl-9-thioxanthenone,
1-(3-dimethylaminopropoxy)-4-methoxy-9-thioxanthenone,
4-(3-dimethylaminopropoxy)-1-methyl-9-thioxanthenone,
2-(3-dimethylaminopropoxy)-5-methyl-8-bromo-9-thioxanthenone,
4-(3-dimethylaminopropoxy)-1-tertiary-butyl-9-thioxanthenone,
4-(3-dimethylaminopropoxy)-1-chloro-2-methyl-9-thioxanthenone,
4-(3-dimethylaminopropoxy)-1-chloro-9-thioxanthenone, or
2-(3-dimethylaminopropoxy)-8-methoxy-9-thioxanthenone can be interacted with benzylmagnesium chloride to give, respectively, 1-(3-dimethylaminopropoxy)-2,4-dimethyl-9-benzyl-9-thioxanthenol;
1-(3-dimethylaminopropoxy)-2,3,4-trimethyl-9-benzyl-9-thioxanthenol;
1-(3-dimethylaminopropoxy)-4-methoxy-9-benzyl-9-thioxanthenol;
4-(3-dimethylaminopropoxy)-1-methyl-9-benzyl-9-thioxanthenol;
2-(3-dimethylaminopropoxy)-5-methyl-8-bromo-9-benzyl-9-thioxanthenol;
4-(3-dimethylaminopropoxy)-1-tertiary-butyl-9-benzyl-9-thioxanthenol;
4-(3-dimethylaminopropoxy)-1-chloro-2-methyl-9-benzyl-9-thioxanthenol;
4-(3-dimethylaminopropoxy)-1-chloro-9-benzyl-9-thioxanthenol; or
2-(3-dimethylaminopropoxy)-8-methoxy-9-benzyl-9-thioxanthenol.

(C) 3 - (LOWER-TERTIARY-AMINO-LOWER-ALKOXY)-9-BENZYLIDENEXANTHENES AND -THIOXANTHENES (III)

Example C1

3 - (2-diethylaminoethoxy)-9-benzylidenexanthene.—3-(2-diethylaminoethoxy)-9-benzyl-9-xanthenol (Example B1) (17.8 g., 0.044 mole) was dissolved in 125 ml. of absolute ethanol and then cooled to below room temperature. Alcoholic hydrochloric acid (7 ml., about 0.07 mole) was then added, and the solution allowed to stand overnight at room temperature. The solution was concentrated in vacuo and the residue crystallized from ethyl acetate and then recrystallized from an absolute ethanol-absolute ether mixture to give 3-(2-diethylaminoethoxy)-9-benzylidenexanthene in the form of its hydrochloride salt as a yellow solid, M.P. 157.2–163.4° C.

Example C2

3 - (2 - diethylaminoethoxy)-9-(4-chlorobenzylidene) xanthene was prepared from 3-(2-diethylaminoethoxy)-9-(4-chlorobenzyl)-9-xanthenol (Example B3) according to the procedure described above in Example C1. It was obtained in the form of its hydrochloride salt as a yellow solid, M.P. 187.8–189.4° C. when recrystallized from a methanol-ether mixture.

Example C3

3 - (2 - diethylaminoethoxy)-6-methyl-9-benzylidenexanthene was prepared from 3-(2-diethylaminoethoxy)-6-methyl-9-benzyl-9-xanthenol (Example B4) according to the procedure described above in Example C1. It was obtained in the form of its hydrochloride salt as a yellow solid. M.P. 195.8–199.4° C. when recrystallized from an ethanol-ether mixture; ultraviolet maxima at 225, 260, 271 and 343 m$\mu$ ($\epsilon$=49,000, 14,100, 13,600 and 11,600).

Example C4

3-(2-diethylaminoethoxy) - 6 - methyl - 9 - (4-chlorobenzylidene)-xanthene was prepared from 3-(2-diethylaminoethoxy)-6-methyl-9-(4 - chlorobenzyl)-9-xanthenol (Example B5) according to the procedure described above in Example C1. It was obtained in the form of its hydrochloride salt as a yellow solid, M.P. 240.2–242.6° C. when recrystallized from methanol.

Example C5

3 - (2 - diethylaminoethoxy)-6-methyl-9-(4-fluorobenzylidene)-xanthene was prepared from 3-(2-diethylaminoethoxy)-6-methyl-9-(4-fluorobenzyl) - 9 - xanthenol (Example B6) according to the procedure described above in Example C1. It was obtained in the form of its hydrochloride salt as a yellow solid, M.P. 204.2–206.4° C. when recrystallized from an ethanol-ether mixture.

Example C6

3 - (2 - diethylaminoethoxy)-6-methyl-9-(4-methylbenzylidene)-xanthene was prepared from 3-(2-diethylaminoethoxy)-6-methyl-9-(4 - methylbenzyl)-9-xanthenol (Example B7) according to the procedure described above in Example C1. It was obtained in the form of its hydrochloride salt as a yellow solid, M.P. 218.8–221.0° C. when recrystallized from an ethanol-ether mixture.

Example C7

3 - (2 - diethylaminoethoxy)-6-methyl-9-(2-chlorobenzylidene)-xanthene was prepared from 3-(2-diethylaminoethoxy)-6-methyl-9-(2 - chlorobenzyl)-9-xanthenol (Example B8) according to the procedure described above in Example C1. It was obtained in the form of its hydrochloride salt as a yellow solid, M.P. 187.2–191.2° C. when recrystallized from an ethanol-ether mixture.

Example C8

3 - (2 - diethylaminoethoxy) - 6 - methyl-9-(3-chlorobenbenzylidene)-xanthene was prepared from 3-(2-diethylaminoethoxy) - 6 - methyl - 9 - (3-chlorobenzyl)-9-xanthenol (Example B9) according to the procedure described above in Example C1. It was obtained in the form of its hydrochloride salt as a yellow solid, M.P. 167.0–170.8° C. when recrystallized from an ethanol-ether mixture.

Example C9

3 - (2 - diethylaminoethoxy) - 6 - methyl-9-(4-bromobenzylidene)-xanthene was prepared from 3-(2-diethylaminoethoxy) - 6 - methyl - 9 - (4-bromobenzyl)-9-xanthenol (Example B10) according to the procedure described above in Example C1. It was obtained in the form of its hydrochloride salt as a yellow solid, M.P. 234–238° C.

A sample of the hydrochloride salt was converted to the free base and treated with a solution of hydrogen bromide in an ethanol-acetic acid mixture. There separated 3 - (2 - diethylaminoethoxy) - 6 - methyl-9-(4-bromobenzylidene)xanthene in the form of its hydrobromide salt, M.P. 218–221° C. when recrystallized from acetic acid.

By replacing the 3-(2-diethylaminoethoxy)-9-benzyl-9-xanthenol in Example C1 by a molar equivalent amount of 3 - (2 - diethylaminoethoxy)-9-(4-methoxybenzyl)-9-xanthenol (Example B2) there can be obtained 3-(2-diethylaminoethoxy)-9-4-methoxybenzylidene)xanthene.

By replacing the 3-(2-diethylaminoethoxy)-9-benzyl-9-xanthenol in Example C1 by a molar equivalent amount of 3-,2-dimethylaminoethoxy)-9-benzyl-9-xanthenol,
3-[2-(1-piperidyl)ethoxy]-9-benzyl-9-xanthenol,
3-[2-(4-morpholinyl)-ethoxy]-9-benzyl-9-xanthenol,
3-[2-(1-pyrrolidyl)ethoxy]-9-benzyl-9-xanthenol,
3-(3-dimethylaminopropoxy)-9-benzyl-9-xanthenol,
3-[2-(N-ethylbenzylamino)ethoxy]-9-benzyl-9-xanthenol or 3-[2-(4-methyl-1-piperazinyl)ethoxy]-9-benzyl-9-xanthenol there can be obtained, respectively, 3-(2-dimethylaminoethoxy)-9-benzylidenexanthene;
3-[2-(1-piperidyl)ethoxy]-9-benzylidene-xanthene;
3-[2-(4-morpholinyl)ethoxy]-9-benzylidenexanthene;
3-[2-(1-pyrrolidyl)ethoxy]-9-benzylidenexanthene;
3-(3-dimethylaminopropoxy)-9-benzylidenexanthene;
3-[2-(N-ethylbenzylamino)-ethoxy]-9-benzylidenexanthene; or
3-[2-(4-methyl-1-piperazinyl)-ethoxy]-9-benzylidenexanthene.

By replacing the 3-(2-diethylaminoethoxy)-9-benzyl-9-xanthenol in Example C1 by a molar equivalent amount of 3-(2-dicyclohexylaminoethoxy)-9-benzyl-9-xanthenol,
3-[2-bis(4-methylcyclohexyl)aminoethoxy]-9-benzyl-9-xanthenol,
3-{2-[N-(cyclopentyl)methylamino]ethoxy}-9-benzyl-9-xanthenol,
3-(2-hexamethyleniminoethoxy)-9-benzyl-9-xanthenol,
3-(2-dibenzylaminoethoxy)-9-benzyl-9-xanthenol,
3-(2-dimethylamino-1-propoxy)-9-benzyl-9-xanthenol, or
3-(2-dimethylamino-1,2-dimethylethoxy)-9-benzyl-9-xanthenol there can be obtained, respectively, 3-(2-dicyclohexylaminoethoxy)-9-benzylidenexanthene;
3-[2-bis-(4-methylcyclohexyl)aminoethoxy]-9-benzylidenexanthene;
3-{2-[N-(cyclopentyl)methylamino]ethoxy}-9-benzylidenexanthene;
3-(2-hexamethyleniminoethoxy)-9-benzylidenexanthene;
3-(2-dibenzylaminoethoxy)-9-benzylidenexanthene;
3-(2-dimethylamino-1-propoxy)-9-benzylidenexanthene;

or 3-(2-dimethylamino-1,2-dimethylethoxy)-9-benzylidenexanthene.

By replacing the 3-(2-diethylaminoethoxy)-9-benzyl-9-xanthenol in Example C1 by a molar equivalent amount of 1-(2-diethylaminoethoxy)-9-benzyl-9-xanthenol,
3-(2-diethylaminoethoxy)-6-bromo-9-benzyl-9-xanthenol,
3-(2-diethylaminoethoxy)-5-butyl-9-benzyl-9-xanthenol,
3-(2-diethylaminoethoxy)-7-chloro-9-benzyl-9-xanthenol,
3-(2-diethylaminoethoxy)-5-bromo-6,7-dimethyl-9-benzyl-9-xanthenol,
3-(2-diethylaminoethoxy)-5-bromo-6,8-dimethoxy-9-benzyl-9-xanthenol,
3-(2-diethylaminoethoxy)-5,7-dichloro-9-benzyl-9-xanthenol,
3-(2-diethylaminoethoxy)-5,6-dimethoxy-9-benzyl-9-xanthenol,
3-(2-diethylaminoethoxy)-6-ethoxy-9-benzyl-9-xanthenol,
3-(2-diethylaminoethoxy)-5-fluoro-9-benzyl-9-xanthenol,
3-(2-diethylaminoethoxy)-6-hexyloxy-9-benzyl-9-xanthenol,
3-(2-diethylaminoethoxy)-5-iodo-9-benzyl-9-xanthenol,
3-(2-diethylaminoethoxy)-7-isopropyl-9-benzyl-9-xanthenol,
3-(2-diethylaminoethoxy)-6-trifluoromethyl-9-benzyl-9-xanthenol,
3-(2-diethylaminoethoxy)-6-trifluoromethoxy-9-benzyl-9-xanthenol, or
3-(2-diethylaminoethoxy)-7-ethylthio-9-benzyl-9-xanthenol there can be obtained, respectively, 1-(2-diethylaminoethoxy)-9-benzylidenexanthene;
3-(2-diethylaminoethoxy)-6-bromo-9-benzylidene-xanthene;
3-(2-diethylaminoethoxy)-5-butyl-9-benzylidenexanthene;
3-(2-diethylaminoethoxy)-7-chloro-9-benzylidene-xanthene;
3-(2-diethylaminoethoxy)-5-bromo-6,7-dimethyl-9-benzylidenexanthene;
3-(2-diethylaminoethoxy)-5-bromo-6,8-dimethoxy-9-benzylidenexanthene;
3-(2-diethylaminoethoxy)-5,7-dichloro-9-benzylidene-xanthene;
3-(2-diethylaminoethoxy)-5,6-dimethoxy-9-benzylidene-xanthene;
3-(2-diethylaminoethoxy)-6-ethoxy-9-benzylidene-xanthene;
3-(2-diethylaminoethoxy)-5-fluoro-9-benzylidene-xanthene;
3-(2-diethylaminoethoxy)-6-hexyloxy-9-benzylidene-xanthene;
3-(2-diethylaminoethoxy)-5-iodo-9-benzylidenexanthene;
3-(2-diethylaminoethoxy) - 7 - isopropyl-9-benzylidenexanthene;
3-(2-diethylaminoethoxy)-6-trifluoromethyl-9-benzylidenexanthene;
3-(2-diethylaminoethoxy)-6-trifluoro-methoxy-9-benzylidenexanthene; or
3-(2-diethylaminoethoxy)-7-ethylthio-9-benzylidenexanthene.

3-(2-diethylaminoethoxy) - 7 - ethylthio-9-benzylidenexanthene can be oxidized with hydrogen peroxide to give first 3-(2-diethylaminoethoxy)-7-ethylsulfinyl - 9 - benzylidenexanthene and then 3-(2-diethylaminoethoxy)-7-ethylsulfonyl-9-benzylidenexanthene.

By replacing the 3-(2-diethylaminoethoxy)-9-benzyl-9-xanthenol in Example C1 by a molar equivalent amount of 3-(2-diethylaminoethoxy)-9-(4-iodobenzyl)-9-xanthenol,
3-(2-diethylaminoethoxy)-9-(4-methylthiobenzyl)-9-xanthenol,
3-(2-diethylaminoethoxy)-9-(3,4,5-trimethoxybenzyl)-9-xanthenol,
3-(2-diethylaminoethoxy)-9-(4-trifluoromethyl)-9-xanthenol,
3-(2-diethylaminoethoxy)-9-(4-trifluoromethoxy)-9-xanthenol, or
3-(2-diethylaminoethoxy)-9-(3-chloro-4-methoxybenzyl)-9-xanthenol there can be obtained, respectively, 3-(2-diethylaminoethoxy)-9-(4-iodobenzylidene)xanthene;
3-(2-diethylaminoethoxy)-9-(4-methylthiobenzylidene)xanthene;
3-(2-diethylaminoethoxy)-9-(3,4,5-trimethoxybenzylidene)xanthene;

3-(2-diethylaminoethoxy)-9-(4-trifluoromethylbenzyl-
idene)xanthene;
3-(2-diethylaminoethoxy)-9-(4-trifluoromethoxybenzyl-
idene)xanthene; or
3-(2-diethylaminoethoxy)-9-(3-chloro-4-methoxybenzyl-
idene)xanthene.

The 4-methylthio compound can be oxidized with hydrogen peroxide to give first 3-(2-diethylaminoethoxy)-9-(4-methylsulfinylbenzylidene)xanthene and then 3-(2-diethylaminoethoxy) - 9 - (4-methylsulfonylbenzylidene) xanthene.

Example C10

3-(2-dimethylaminoethoxy)-9- benzylidenethioxanthene was prepared by dehydration of 3-(2-dimethylaminoethoxy)-9-benzyl-9-thioxanthenol (Example B11) with hydrogen chloride in acetone-ethanol solution, and was obtained in the form of its hydrochloride salt, yellow solid M.P. 137.0–147.0° C. when recrystallized from isopropyl alcohol.

Example C11

3-[2-(1-piperidyl)ethoxy] - 9 - benzylidenethioxanthene was prepared by dehydration of 3 - [2 - (1 - piperidyl) ethoxy]-9-benzyl-9-thioxanthenol and was obtained in the form of its hydrochloride salt, yellow solid M.P. 157.0–170.0° C. when recrystallized from an isopropyl alcohol-ether mixture.

Example C12

3-[2-(1-piperidyl)ethoxy] - 9 - (p-chlorobenzylidene) thioxanthene was prepared by dehydration of 3-[2-(1-piperidyl)ethoxy]-9-(p-chlorobenzyl) - 9 - thioxanthenol (Example B13), and was obtained in the form of its hydrochloride salt, pale yellow solid, M.P. 218–225° C. when recrystallized from an acetone-ether mixture.

Example C13

3 - (3 - dimethylaminopropoxy) - 9 - benzylidenethioxanthene was prepared by dehydration of 3-(3-dimethylaminopropoxy)-9-benzyl - 9 - thioxanthenol, and was obtained in the form of its hydrochloride salt, pale yellow solid M.P. 192–196° C. when recrystallized from an ethanol-ether mixture. The free base had the M.P. 87.5–90.5° C. (yellow solid from benzene-hexane).

Example C14

3-[2-(1 - pyrrolidyl)ethoxy] - 9 - benzylidenethioxanthene was prepared by dehydration of 3-[2-(1-pyrrolidyl) ethoxy]-9-benzyl-9-thioxanthenol (Example B17), and was obtained in the form of its hydrochloride salt, yellow solid M.P. 144–150° C. when recrystallized from an acetone-ether mixture.

Example C15

3-(2-diethylaminoethoxy) - 9 - benzylidenethioxanthene was prepared by dehydration of 3 - (2 - diethylaminoethoxy)-9-benzyl-9-thioxanthenol (Example B14), and was obtained in the form of its hydrochloride salt, yellow solid M.P. 145–155° C. when recrystallized from an isopropyl alcohol-ether mixture.

The methobromide quaternary salt form of 3-(2-diethylaminoethoxy) - 9 - benzylidenethioxanthene was obtained as a yellow solid, M.P. 185–189° C. when recrystallized from an ethanol-ether mixture.

According to the procedure of Example C1.

2-(2-dimethylaminoethoxy)-9-benzyl-9-thioxanthenol
(Example B15),
3-[2-(4-methyl-1-piperazinyl)ethoxy]-9-benzyl-9-
thioxanthenol (Example B16),
3-(2-diethylaminoethoxy)-9-(p-chlorobenzyl)-9-
thioxanthenol (Example B18),
3-(3-diethylaminopropoxy)-9-benzyl-9-thioxanthenol
(Example B19),
3-(2-diethylaminoethoxy)-9-(p-methylbenzyl-9-
thioxanthenol (Example B20), or
3-(2-diethylaminoethoxy)-9-(p-fluorobenzyl)-1-
thioxanthenol (Example B21)

can be dehydrated to give, respectively, 2-(2-dimethylaminoethoxy)-9-benzylidenethioxanthene,
3-[2-(4-methyl-1-piperazinyl)ethoxy]-9-
benzylidenethioxanthene,
3-(2-diethylaminoethoxy)-9-(p-chlorobenzylidene)
thioxanthene,
3-(3-diethylaminoproxy)-9-benzylidenethioxanthene,
3-(2-diethylaminoethoxy)-9-(p-methylbenzylidene)
thioxanthene, or
3(2-diethylaminoethoxy)-9-(p-fluorobenzylidene)
thioxanthene.

Similarly,

3-[2-(4-morpholinyl)ethoxy]-9-benzylidenethioxanthene,
3-[2-(4-phenyl-1-piperazinyl)ethoxy]-9-benzyl-9-
thioxanthenol,
3-(3-dimethylamino-2-methylpropoxy)-9-benzyl-9-
thioxanthenol,
3-(4-dimethylaminobutoxy)-9-benzyl-9-thioxanthenol,
3-(3-dimethylaminopropoxy)-9-benzyl-9-thioxanthenol-
10,10-dioxide or
4-(3-dimethylaminopropoxy)-1-methyl-9-benzyl-9-
thioxanthenol-10,10-dioxide can be dehydrated to give,
respectively,
3-[2-(4-morpholinyl)ethoxy]-9-benzylidenethioxanthene,
3-[2-(4-phenyl-1-piperazinyl)ethoxy]-9-benzylidenethio-
xanthene,
3-(3-dimethylamino-2-methylpropoxy)-9-benzylidenethio-
xanthene (M.P. 128–135° C. when recrystallized from
acetone-ether),
3-(4-dimethylaminobutoxy)-9-benzylidenethioxanthene
(yellow solid, M.P. 199–202° C.),
3-(3-dimethylaminopropoxy)-9-benzylidenethioxanthene-
10,10-dioxide or
4-(3-dimethylaminopropoxy)-1-methyl-9-benzylidenethio-
xanthene-10,10-dioxide.

By the procedure described in Example C1, 1-(3-dimethylaminopropoxy)-2,4-dimethyl-9-benzyl-9-
thioxanthenol,
1-(3-dimethylaminopropoxy)-2,3,4-trimethyl-9-benzyl-
9-thioxanthenol,
1-(3-dimethylaminopropoxy)-4-methoxy-9-benzyl-9-
thioxanthenol,
4-(3-dimethylaminopropoxy)-1-methyl-9-benzyl-9-
thioxanthenol,
2-(3-dimethylaminopropoxy)-5-methyl-8-bromo-9-benzyl-
9-thioxanthenol,
4-(3-dimethylaminopropoxy)-1-tertiary-butyl-9-benzyl-
9-thioxanthenol,
4-(3-dimethylaminopropoxy)-1-chloro-2-methyl-9-
benzyl-9-thioxanthenol,
4-(3-dimethylaminopropoxy)-1-chloro-9-benzyl-9-
thioxanthenol, or
2-(3-dimethylaminopropoxy)-81methoxy-9-benzyl-9-
thioxanthenol can be dehydrated to give respectively,
1-(3-dimethylaminopropoxy)-2,4-dimethyl-9-benzyl-
idenethioxanthene;
1-(3-dimethylaminopropoxy)-2,3,4-trimethyl-9-
benzylidenethioxanthene;
1-(3-dimethylaminopropoxy)-4-methoxy-9-benzylidene-
thioxanthene;
4-(3-dimethylaminopropoxy)-1-methyl-9-benzylidene-
thioxanthene;
2-(3-dimethylaminopropoxy)-5-methyl-8-bromo-9-
benzylidenethioxanthene;
4-(3-dimethylaminopropoxy)-1-tertiary-butyl-9-
benzylidenethioxanthene;

4-(3-dimethylaminopropoxy)-1-chloro-2-methyl-9-benzylidenethioxanthene;

4-(3-dimethylaminopropoxy)-1-chloro-9-benzylidenethioxanthene; or 2-(3-dimethylaminopropoxy)-8-methoxy-9-benzylidenethioxanthene.

(D) 3 - (LOWER - TERTIARY - AMINO - LOWER-ALKOXY) - 9 - BENZYLXANTHENES AND -THIOXANTHENES (IV)

Example D1

3-(2-diethylaminoethoxy) - 9 - benzylxanthene. — 3-(2-diethylaminoethoxy) - 9 - benzylidenezanthene (Example C1) (8.4 g.) was dissolved in 100 ml. of ethanol by heating and the solution cooled to room temperature. Ten percent palladium-on-charcoal catalyst (3 g.) was added and the mixture was hydrogenated until the theoretical amount of hydrogen had been absorbed (about one-half hour). The mixture was filtered, the filtrate concentrated in vacuo and the residue recrystallized first from an ethanol-ether mixture and then from an acetone-ether mixture to give 6.5 g. of 3-(2-diethylaminoethoxy)-9-benzylxanthene in the form of its hydrochloride salt, M.P. 176.0–178.8° C.

Example D2

3-(2-diethylaminoethoxy)-9-(4 - chlorobenzyl)xanthene was prepared from 3-(2-diethylaminoethoxy)-9-(4-chlorobenzylidene)xanthene (Example C2) according to the procedure described above in Example D1. It was obtained in the form of its hydrochloride salt, M.P. 196.8–205.0° C. when recrystallized from an ethanol-ether mixture.

Example D3

3-(2 - diethylaminoethoxy)-6-methyl-9-benzylxanthene was prepared. It was obtained in the form of its hydrochloride salt, M.P. 173.0–174.9° C. when recrystallized from acetone; ultraviolet maxima at 246 and 276 m$\mu$ ($\epsilon$=6000 and 4700).

Example D4

3-(2-diethylaminoethoxy)-6-methyl - 9 - (4-chlorobenzyl)xanthene was prepared from 3-(2-diethylaminoethoxy)-6-methyl-9-(4 - chlorobenzylidene)xanthene (Example C4) according to the procedure described above in Example D1. It was obtained in the form of its hydrochloride salt, M.P. 181.4–182.2° C. when recrystallized from acetone.

Example D5

3-(2-diethylaminoethoxy - 6 - methyl-9-(4-fluorobenzyl)xanthene was prepared from 3-(2-diethylaminoethoxy)-6-methyl-9-(4 - fluorobenzylidene)xanthene (Example C5) according to the procedure described above in Example D1. It was obtained in the form of its hydrochloride salt, M.P. 183.2–188.8° C. when recrystallized from an ethanol-ether mixture.

Example D6

3-(2-diethylaminoethoxy) - 6 - methyl-9-(4-methylbenzyl)xanthene was prepared from 3-(2-diethylaminoethoxy)-6-methyl-9-(4-methylbenzylidene)xanthene (Example C6) according to the procedure described above in Example D1. It was obtained in the form of its hydrochloride salt, M.P. 184.2–186.0° C. when recrystallized from an ethanol-acetone-ether mixture.

Example D7

3-(2-diethylaminoethoxy) - 6 - methyl-9-(2-chlorobenzyl)xanthene was prepared from 3-(2-diethylaminoethoxy)-6-methyl-9-(2-chlorobenzylidene)xanthene (Example C7) according to the procedure described above in Example D1. It was obtained in the form of its hydrochloride salt, M.P. 138.2–149.0° C. when recrystallized from ethyl acetate.

Example D8

3-(2-diethylaminoethoxy) - 6 - methyl-9-(3-chlorobenzyl)xanthene was prepared from 3-(2-diethylaminoethoxy) - 6 - methyl-9-(3-chlorobenzylidene)xanthene (Example C8) according to the procedure described above in Example D1. It was obtained in the form of its hydrochloride salt, M.P. 112.4–130.0° C. when recrystallized from a chloroform-ethyl acetate-ether mixture.

Example D9

3-(2-diethylaminoethoxy) - 6 - methyl-9-(4 - bromobenzyl)xanthene was prepared from 3-(-2-diethylaminoethoxy) - 6 - methyl-9-(4 - bromobenzylidene)xanthene (Example C9) according to the procedure described above in Example D1 except that acetic acid was used instead of ethanol as a reaction medium. The product was obtained in the form of its hydrochloride salt, M.P. 190–212° C. when recrystallized from a chloroform-ethyl acetate-ether mixture.

By replacing the 3-(2-diethylaminoethoxy)-9- benzylidenexanthene in Example D1 by a molar equivalent amount of 3-(2-diethylaminoethoxy)-9-(4-methoxybenzylidene)xanthene there can be obtained 3-(2-diethylaminoethoxy)-9-(4-methoxybenzyl)xanthene.

By replacing the 3-(2-diethylaminoethoxy)-9-benzylidenexanthene in Example D1 by a molar equivalent amount of 3-(2-dimethylaminoethoxy)-9-benzylidenexanthene,
3-[2-(1-piperidyl)ethoxy]-9-benzylidenexanthene,
3-[2-(4-morpholinyl)-ethoxy]-9-benzylidenexanthene,
3-[2-(1-pyrrolidyl)ethoxy]-9-benzylidenexanthene,
3-(3-dimethylaminopropoxy)-9-benzylidenexanthene,
3-[2-(N-ethylbenzylamino)ethoxy] - 9 - benzylidenexanthene, or
3-[2-(4-methyl-1-piperazinyl)ethoxy]-9-benzylidenexanthene there can be obtained, respectively, 3-(2-dimethylaminoethoxy)-9-benzylxanthene;
3-[2-(1-piperidyl)ethoxy]-9-benzylxanthene;
3-[2-(4-morpholinyl)ethoxy]-9-benzylxanthene;
3-[2-(1-pyrrolidyl)ethoxy]-9-benzylxanthene;
3-(3-dimethylaminopropoxy)-9-benzylxanthene;
3-[2-(N-ethylbenzylamino)ethoxy]-9-benzylxanthene; or
3-[2-(4-methyl-1-piperazinyl)ethoxy]-9-benzylxanthene.

By replacing the 3-(2-diethylaminoethoxy)-9-benzylidenexanthene in Example D1 by a molar equivalent amount of 3-(2-dicyclohexylaminoethoxy)-9-benzylidenexanthene,
3-[2-bis(4-methylcyclohexyl)aminoethoxy]-9-benzylidenexanthene,
3-{2-[N-(cyclopentyl)methylamino]ethoxy}-9-benzylidenexanthene,
3-(2-hexamethyleniminoethoxy)-9-benzylidenexanthene,
3-(2-dibenzylaminoethoxy)-9-benzylidenexanthene,
3-(2-dimethylamino-1-propoxy)-9-benzylidenexanthene, or
3-(2-dimethylamino-1,2-dimethylethoxy)-9-benzylidenexanthene there can be obtained, respectively, 3-(2-dicyclohexylaminoethoxy)-9-benzylxanthene;
3-[2-bis(4-methylcyclohexyl)aminoethoxy]-9-benzylxanthene;
3-{2-[N-cyclopentyl)methylamino]ethoxy}-9-benzylxanthene;
3-(2-hexamethyleniminoethoxy)-9-benzylxanthene;
3-(2-dibenzylaminoethoxy)-9-benzylxanthene;
3-(2-dimethylamino-1-propoxy)-9-benzylxanthene; or
3-(2-dimethylamino-1,2-dimethylethoxy)-9-benzylxanthene.

By replacing the 3-(2-diethylaminoethoxy)-9-benzylidenexanthene in Example D1 by a molar equivalent amount of 1-(2-diethylaminoethoxy)-9-benzylidenexanthene,
3-(2-diethylaminoethoxy)-6-bromo-9-benzylidenexanthene,
3-(2-diethylaminoethoxy)-5-butyl-9-benzylidenexanthene,
3-(2-diethylaminoethoxy)-7-chloro-9-benzylidenexanthene,
3-(2-diethylaminoethoxy)-5-bromo-6,7-dimethyl-9-benzylidenexanthene,
3-(2-diethylaminoethoxy)-5-bromo-6,8-dimethoxy-9-benzylidenexanthene,
3-(2-diethylaminoethoxy)5,7-dichloro-9-benzylidenexanthene,
3-(2-diethylaminoethoxy)-5,6-dimethoxy-9-benzylidenexanthene,
3-(2-diethylaminoethoxy)-6-ethoxy-9-benzylidenexanthene,
3-(2-diethylaminoethoxy)-5-fluoro-9-benzylidenexanthene,
3-(2-diethylaminoethoxy)-6-hexyloxy-9-benzylidenexanthene,
3-(2-diethylaminoethoxy)-5-iodo-9-benzylidenexanthene,
3-(2-diethylaminoethoxy)-7-isopropyl-9-benzylidenexanthene,
3-(2-diethylaminoethoxy)-6-trifluoromethyl-9-benzylidenexanthene,
3-(2-diethylaminoethoxy)-6-trifluoromethoxy-9-benzylidenexanthene, or
3-(2-diethylaminoethoxy)-7-ethylthio-9-benzylidenexanthene, there can be obtained, respectively, 1-(2-diethylaminoethoxy)-9-benzylxanthene;
3-(2-diethylaminoethoxy)-6-bromo-9-benzylxanthene;
3-(2-diethylaminoethoxy)-5-butyl-9-benzylxanthene;
3-(2-diethylaminoethoxy)-7-chloro-9-benzylxanthene;
3-(2-diethylaminoethoxy)-5-bromo-6,7-dimethyl-9-benzylxanthene;
3-(2-diethylaminoethoxy)-5-bromo-6,8-dimethoxy-9-benzylxanthene;
3-(2-diethylaminoethoxy)-5,7-dichloro-9-benzylxanthene;
3-(2-diethylaminoethoxy)-5,6-dimethoxy-9-benzylxanthene;
3-(2-diethylaminoethoxy)-6-ethoxy-9-benzylxanthene;
3-(2-diethylaminoethoxy)-5-fluoro-9-benzylxanthene;
3-(2-diethylaminoethoxy)-6-hexyloxy-9-benzylxanthene;
3-(2-diethylaminoethoxy)-5-iodo-9-benzylxanthene;
3-(2-diethylaminoethoxy)-7-isopropyl-9-benzylxanthene;
3-(2-diethylaminoethoxy)-6-trifluoromethyl-9-benzylxanthene;
3-(2-diethylaminoethoxy)-6-trifluoromethoxy-9-benzylxanthene; or
3-(2-diethylaminoethoxy)-7-ethylthio-9-benzylxanthene.

3-(2-diethylaminoethoxy)-7-ethylthio - 9 - benzylxanthene can be oxidized with hydrogen peroxide to give first 3-(2-diethylaminoethoxy)-7-ethylsulfinyl-9-benzylxanthene and then 3-(2 - diethylaminoethoxy)-7-ethylsulfonyl-9-benzylxanthene.

By replacing the 3-(2-diethylaminoethoxy)-9-benzylidenexanthene in Example D1 by a molar equivalent amount of 3-(2-diethylaminoethoxy)-9-(4-iodobenzylidene)xanthene,
3-(2-diethylaminoethoxy)-9-(4-methylthiobenzylidene)xanthene,
3-(2-diethylaminoethoxy)-9-(3,4,5-trimethoxybenzylidene)xanthene,
3-(2-diethylaminoethoxy)-9-(4-trifluoromethylbenzylidene)-xanthene,
3-(2-diethylaminoethoxy)-9-(4-trifluoromethoxymenzylidene)xanthene, or
3-(2-diethylaminoethoxy)-9-(3-chloro-4-methoxybenzylidene)xanthene there can be obtained, respectively, 3-(2-diethylaminoethoxy)-9-(4-iodobenzyl)xanthene;
3-(2-diethylaminoethoxy)-9-(4-methylthiobenzyl)xanthene;
3-(2-diethylaminoethoxy)-9-(3,4,5-trimethoxybenzyl)xanthene;
3-(2-diethylaminoethoxy)-9-(4-trifluoromethylbenzyl)xanthene;
3-(2-diethylaminoethoxy)-9-(4-trifluoromethoxybenzyl)xanthene; or
3-(2-diethylaminoethoxy)-9-(3-chloro-4-methoxybenzyl)xanthene.

By the procedure described in Example D1

1-(3-dimethylaminopropoxy)-2,4-dimethyl-9-benzylidenethioxanthene,
1,(3-dimethylaminopropoxy)-2,3,4-trimethyl-9-benzylidenethioxanthene,
1-(3-dimethylaminopropoxy)-4-methoxy-9-benzylidenethioxanthene,
4-(3-dimethylaminopropoxy)-1-methyl-9-benzylidenethioxanthene,
2-(3-dimethylaminopropoxy)-5-methyl-8-bromo-9-benzylidene thioxanthene,
4-(3-dimethylaminopropoxy)-1-tertiary-butyl-9-benzylidienethioxanthene,
4-(3-dimethylaminopropoxy)-1-chloro-8-methyl-9-benzylidenethioxanthene,
4-(3-dimethylaminopropoxy)-1-chloro-9-benzylidenethioxanthene, or
2-(3-dimethylaminopropoxy)-8-methoxy-9-benzylidenethioxanthene can be reduced to give, respectively, 1-(3-dimethylaminopropoxy)-2,4-dimethyl-9-benzylthioxanthene;
1-(3-dimethylaminopropoxy)-2,3,4,-trimethyl-9-benzylthioxanthene;
1-(3-dimethylaminopropoxy)-4-methoxy-9-benzylthioxanthene;
4-(3-dimethylaminopropoxy)-1-methyl-9-benzylthioxanthene;
2-(3-dimethylaminopropoxy)-5-methyl-8-bromo-9-benzylthioxanthene;
4-(3-dimethylaminopropoxy)-1-tertiary-butyl-9-benzylthioxanthene;
4-(3-dimethylaminopropoxy)-1-chloro-2-methyl-9-benzylthioxanthene;
4-(3-dimethylaminopropoxy)-1-chloro-9-benzylthioxanthene; or
2-(3-dimethylaminopropoxy)-8-methoxy-9-benzylthioxanthene.

According to the procedure of Example D1 the following compounds can be reduced:

3-(2-dimethylaminoethoxy)-9-benzylidenethioxanthene (Example C10),
3-[2-(1-piperidyl)ethoxy]-9-benzylidenethioxanthene (Example C11),
3-[2-(1-piperidyl)ethoxy]-9-(p-chlorobenzylidene)thioxanthene (Example C12),
3-(3-dimethylaminopropoxy)-9-benzylidenethioxanthene (Example C13),
3-[2-(1-pyrrolidyl)ethoxy]-9-benzylidenethioxanthene (Example C14), 3-(2-diethylaminoethoxy)-9-benzylidenethioxanthene (Example C15),
2-(2-dimethylaminoethoxy)-9-benzylidenethioxanthene,
3-[2-(4-methyl-1-piperazinyl)ethoxy]-9-benzylidenethioxanthene,
3-(2-diethylaminoethoxy)-9-(p-chlorobenzylidene)thioxanthene,
3-(3-diethylaminopropoxy)-9-benzylidenethioxanthene,
3-(2-diethylaminoethoxy)-9-(p-methylbenzylidene)thioxanthene,
3-(2-diethylaminoethoxy)-9-(p-fluorobenzylidene)thioxanthene,
3-[2-(4-morpholinyl)ethoxy]-9-benzylidenethioxanthene,
3-[2-(4-phenyl-1-piperazinyl)ethoxy]-9-benzylidenethioxanthene,
3-(3-dimethylamino-8-methylpropoxy)-9-benzylidenethioxanthene,
3-(4-dimethylaminobutoxy)-9-benzylidenethioxanthene,
3-(3-dimethylaminopropoxy)-9-benzylidenethioxanthene-10,10-dioxide or
4-(3-dimethylaminopropoxy)-1-methyl-9-benzylidenethioxanthene-10,10-dioxide to produce, respectively,
3-(2-dimethylaminoethoxy)-9-benzylthioxanthene,
3-[2-(1-piperidyl)ethoxy]-9-benzylthioxanthene,
3-[2-(1-piperidyl)ethoxy]-9-(p-chlorobenzyl)thioxanthene,
3-(3-dimethylaminopropoxy)-9-benzylthioxanthene,
3-[2-(1-pyrrolidyl)ethoxy]-9-benzylthioxanthene,
3-(2-diethylaminoethoxy)-9-benzylthioxanthene,
2-(2-dimethylaminoethoxy)-9-benzylthioxanthene,
3-[2-(4-methyl-1-piperazinyl)ethoxy]-9-benzylthioxanthene,
3-(2-diethylaminoethoxy)-9-(p-chlorobenzyl)thioxanthene,
3-(3-diethylaminopropoxy)-9-benzylthioxanthene,
3-(2-diethylaminoethoxy)-(p-methylbenzyl)thioxanthene,
3-(2-diethylaminoethoxy)-9-(p-fluorobenzyl)thioxanthene,
3-[2-(4-morpholinyl)ethoxy]-9-benzylthioxanthene,
3-[2-(4-phenyl-1-piperazinyl)ethoxy]-9-benzylthioxanthene,
3-(3-dimethylamino-2-methylpropoxy)-9-benzylthioxanthene,
3-(4-dimethylaminobutoxy)-9-benzylthioxanthene,
3-(3-dimethylaminopropoxy)-9-benzylthioxanthene-10,10-dioxide or
4-(3-dimethylaminopropoxy)-1-methyl-9-benzylthioxanthene-10,10-dioxide.

An alternative approach to the compounds of Formula IV is illustrated by the following example.

Example D10

(a) 3-methoxy-9-benzyl-9-thioxanthenol was prepared by reacting 3-methoxy-9-thioxanthenone with benzylmagnesium chloride according to the procedure of Example B1. The product had the M.P. 127–131° C. when recrystallized from a benzene-hexane mixture.

(b) 3-hydroxy-9-benzylthioxanthene.—A mixture of 5.8 g. of 3-methoxy-9-benzyl-9-thioxanthenol, 22.6 ml. of 55.58% aqueous hydriodic acid and 1.4 g. of red phosphorus was refluxed for five and one-half hours. An additional 0.98 g. of red phosphorus was added and the mixture refluxed five hours longer. The mixture was poured into water, filtered, and the solid material leached with ethanol and filtered. The combined filtrates were concentrated to remove the solvent and the residue crystallized from benzene-hexane to give 3-hydroxy-9-benzylthioxanthene, M.P. 182–186° C.

(c) 3 - (3 - dimethylaminopropoxy)-9-benzylthioxanthene was prepared from 3-hydroxy-9-benzylthioxanthene and 3-dimethylaminopropyl chloride according to the procedure of Example A1. The product had the M.P. 70–72° C. when recrystallized from aqueous ethanol.

The actual determination of the numerical biological data definitive for a particular compound is readily obtained by standard test procedures, as described below, by technicians having ordinary skill in pharmacological test procedures, without need for any extensive experimentation.

The anti-inflammatory activity was measured by the inhibition of lung inflammation in mice induced according to a modified procedure of Herrman et al., Am. J. Physiol. 197, 803–807 (1959) as follows: Male of albino mice weighing approximately 25 g. are divided into groups of at least five mice and are medicated orally or subcutaneously with an aqueous solution of a water-soluble salt form of the test compound once daily for four days. The control mice receive the vehicle of the medication only. On the second day of medication, 0.1 mg. (0.05 ml. of a 0.2% solution) of *E. coli* endotoxin is administered to each mouse intratracheally. One group of normal control mice receive no endotoxin. The mice are sacrificed 72 hours later, and the lungs are dissected, graded for degree of consolidation (1+ to 4+) and weighed. The difference between the average degree of lung consolidation of the control and the medicated mice is expressed as percent inhibition. The increase in average lung weights is calculated by subtracting the average normal lung weight from the average lung weights of the endotoxin-treated mice. The difference between the increase in lung weights of control and medicated mice is expressed as percent inhibition. The average of the two criteria (inhibition of lung consolidation and of increase in lung weight) is taken as the index of the inhibitory activity of the test compound.

The anti-ulcerogenic activity was measured by two methods, by determination of the gastric anti-secretory activity and the inhibition of reserpine-induced ulcers in rats as follows:

The gastric anti-secretory tests were carried out as follows: Male albino Wistar rats, weighing approximately 180 gms. are divided into medicated groups of about five rats each and control groups of ten rats. The rats are medicated orally with an aqueous solution of a water-soluble salt form of the compound to be tested once daily two days prior to stomach ligation and once again immediately following ligation (3 times in 3 days). The control rats receive only the vehicle of the medication. The methods employed in this test are essentially those established by Shay et al. [Gastroenterology 26, 906 (1954)] with a few minor modifications. The rats are housed individually in cages with wire bottoms to prevent coprophagy. Food is withdrawn 48 hours prior to surgery and water is withdrawn at time of surgery. Laparotomy is performed under light ether anesthesia, the pyloric-duodenal junction is ligated, the wound is closed with metal clips and sprayed with a protective surgical dressing. Five hours post surgery the rats are sacrificed, their stomachs removed and the gastric juice is collected. The gastric fluid is centrifuged and the total volume, color and volume of solids is recorded. The pH of the gastric fluid is then determined on a Beckman pH meter. The "free" and "total" acid is determined from an aliquot of the gastric fluid by titrating with 0.1 normal sodium hydroxide. The difference between the average amount of "free" acid (expressed as milliequivalents of HCl per liter of gastric juice) of the medicated and control groups is expressed as percent gastric secretory change (percent difference in acidity in medicated from control animals).

The anti-ulcer tests were carried out as follows: Male albino Sprague-Dawley rats, weighing approximately 300 gms. are divided into medicated and control groups of at least five rats each. One positive control group (known drug at active dose) of five rats each is run with each experiment. The rats are medicated 48, 24 and 1 hours before receiving an injection of reserpine. All drugs are administered orally with an aqueous solution of a water-soluble salt form of the compound to be tested and the control rats receive only the vehicle of the medication. The rats are housed individually in cages with wire bottoms to prevent coprophagy. Food is withdrawn 24 hours prior to injection of reserpine while water is allowed ad libitum. The methods employed in this test are similar to those used by others [e.g., Hillyard and Grandy, J. Pharmacol. and Exptl. Therap. 142, 358 (1963)]. One hour following the third medication, 5.0 mg. of reserpine per kilogram body weight in a concentration of 5 mg./ml. is injected intramuscularly in each rat. Eighteen hours post injection the rats are sacrificed, their stomachs removed and opened along the greater curvature. The stomachs are rinsed in warm saline and pinned to a cork board for gross observation. The stomachs are examined for the number and size of ulcerations with the aid of a one millimeter grid ocular with a 10× dissecting microscope. These ulcers are located in the glandular portion of the stomach. The degree of ulceration is graded according to the number and size of the ulcers as follows:

0–<1 mm.² 1 point per ulcer
1–<3 mm.² 2 points per ulcer
≥3 mm.² 5 points per ulcer The number of ulcers for each rat that falls within this ascribed size category are multipled by the points designated. The total points for all rats for each group are added and divided by the number of rats in each group, resulting in a mean ulcer score. The difference in the mean scores of the medicated and control groups is expressed as percent inhibition of ulceration.

The compounds of the invention are effective in dose levels ranging from about 5 to about 200 mg./kg., depending upon the specific compound used and the route of administration. The effective dose levels are well below those at which toxic reactions are observed. The compounds are prepared for use by conventional pharmaceutical formulation procedures; that is, in capsule or tablet form with conventional excipients (for example, calcium carbonate, starch, lactose, talc, magnesium stearate, gum acacia, and the like) for oral administration; or as an aqueous or oil solution or suspension in a pharmaceutically acceptable vehicle (water, aqueous alcohol, glycol, oil solution or oil-water emulsion) for oral or parenteral administration.

Specific results for the testing of individual compounds are given in the following tables.

TABLE I.—ANTI-INFLAMMATORY ACTIVITY
[Inhibition of endotoxin-induced lung inflammation]

| Compound of Example No. | Dose, mg./kg. | Route: oral (p.o.) or subcutaneous (s.c.) | Percent inhibition |
|---|---|---|---|
| B4 | 100 | p.o. | 24 |
| C1 | 100 | s.c. | 56 |
| C2 | 100 | p.o. | 33 |
| | 100 | s.c. | 66 |
| C3 | 100 | s.c. | 74 |
| C4 | 25 | s.c. | 44 |
| | 25 | p.o. | 31 |
| C5 | 100 | s.c. | 55 |
| C6 | 100 | s.c. | 48 |
| C7 | 100 | s.c. | 86 |
| | 25 | p.o. | 32 |
| C8 | 25 | s.c. | 37 |
| | 25 | p.o. | 24 |
| C10 | 100 | s.c. | 61 |
| D1 | 100 | s.c. | 38 |
| D2 | 100 | s.c. | 54 |
| D4 | 100 | s.c. | 53 |
| D5 | 25 | s.c. | 38 |
| | 25 | p.o. | 42 |
| D6 | 100 | s.c. | 42 |
| D7 | 25 | s.c. | 56 |
| D8 | 25 | s.c. | 44 |
| | 100 | p.o. | 48 |

TABLE II.—ANTI-SECRETORY ACTIVITY

| Compound of Example No. | Dose, mg./kg. | Percent difference in acidity |
|---|---|---|
| B4 | 25 | −54 |
| | 100 | −88 |
| B11 | 6.25 | −31 |
| | 100 | −77 |
| B12 | 25 | −49 |
| | 100 | −64 |
| B13 | 50 | −28 |
| | 100 | −49 |
| B14 | 50 | −51 |
| | 200 | −100 |
| B15 | 25 | −25 |
| | 200 | −94 |
| B17 | 25 | −40 |
| | 200 | −85 |
| B18 | 25 | −50 |
| | 100 | −100 |
| B19 | 25 | −42 |
| | 100 | −94 |
| B20 | 25 | −25 |
| | 200 | −100 |
| B21 | 25 | −26 |
| | 200 | −100 |
| B22 | 100 | −83 |
| B24 | 6.25 | −40 |
| | 100 | −80 |
| B25 | 50 | −14 |
| | 100 | −33 |
| B26 | 12.5 | −31 |
| | 100 | −51 |
| B27 | 6.25 | −25 |
| | 25 | −68 |
| | 50 | −95 |
| C1 | 25 | −45 |
| | 100 | −85 |
| C4 | 100 | −43 |
| C10 | 25 | −26 |
| | 200 | −100 |
| C11 | 50 | −56 |
| C12 | 50 | −41 |
| C13 | 25 | −46 |
| | 200 | −96 |
| C14 | 25 | −23 |
| | 100 | −82 |
| C15 | 25 | −29 |
| | 100 | −66 |
| D2 | 100 | −33 |
| D5 | 50 | −47 |
| D10 | 50 | −37 |
| | 100 | −66 |

TABLE III.—ANTI-ULCER ACTIVITY

| Compound of Example No. | Dose, mg./kg. | Percent inhibition |
|---|---|---|
| B11 | 50 | 14 |
| B14 | 25 | 41 |
| | 100 | 93 |
| B17 | 50 | 5 |
| B20 | 50 | 26 |
| B21 | 50 | 64 |
| B22 | 100 | 22 |
| B24 | 12.5 | 54 |
| | 50 | 92 |
| B27 | 6.25 | 16 |
| | 25 | 41 |
| | 100 | 91 |
| C10 | 25 | 22 |
| | 100 | 100 |
| C13 | 50 | 85 |
| | 100 | 99 |

I claim:
1. A compound of the formula

$$\text{Q} \underset{\text{X}}{\overset{\text{CH-R}}{\bigodot}} \text{Q}' \text{—O—Y—N=B}$$

wherein N=B is a member of the group consisting of di-lower alkylamino, dicycloalkylamino in which the cycloalkyl has from 5 to 6 ring members and a total of from five to nine carbon atoms, N-(cycloalkyl)-lower-alkylamino in which the cycloalkyl has from 5 to 6 ring members and a total of from five to nine carbon atoms, polymethylenimino having from 5 to 7 ring members and a total of from four to nine carbon atoms, 4-morpholinyl, 1-piperazinyl, 4-methyl-1-piperazinyl, 4-phenyl-1-piperazinyl, di-(phenyl-lower-alkyl)amino, and N-(phenyl-lower-alkyl)-lower-alkylamino; Y is a lower-alkylene bridge having its connecting valances on different carbon atoms; R is phenyl or phenyl substituted by from one to three groups selected from lower-alkyl, lower-alkoxy, lower-alkylthio, lower-alkylsulfinyl, lower-alkylsulfonyl, trifluoromethyl, trifluoromethoxy and halogen; X is O, S or $SO_2$; and Q and Q' represent hydrogen or from one to three groups selected from lower-alkyl, lower-alkoxy, lower-alkylthio, lower-alkylsulfinyl, lower-alkylsulfonyl, trifluoromethyl, trifluoromethoxy and halogen.

2. A compound according to claim 1 wherein N=B is di-lower-alkylamino, R is phenyl, Q and Q' are hydrogen and the basic side chain is in the 3-position.

3. 3-(2-diethylaminoethoxy)- 9 - benzylidenexanthene, according to claim 2 wherein N=B is diethylamino, Y is ethylene and X is O.

4. 3-(2 - dimethylaminoethoxy) - 9 - benzylidenthioxanthene, according to claim 2 wherein N=B is dimethylamino, Y is ethylene and X is S.

5. 3 - [2 - (1 - piperidyl)ethoxy] - 9 - benzylidenthioxanthene, according to claim 1 wherein N=B is 1-piperidyl, Y is ethylene, R is phenyl, X is S, Q and Q' are hydrogen and the basic side chain is in the 3-position.

6. 3 - (3 - dimethylaminopropoxy) - 9 - benzylidenthioxanthene, according to claim 2 wherein N=B is dimethylamino, Y is propylene and X is S.

7. 3 - (2 - diethylaminoethoxy) - 9 - benzylidenthioxanthene, according to claim 2 wherein N=B is diethylamino, Y is ethylene and X is S.

8. 3 - [2 - (1 - pyrrolidyl)ethoxy] - 9 - benzylidenthioxanthene, according to claim 1 wherein N=B is 1-pyrrolidyl, Y is ethylene, R is phenyl, X is S, Q and Q' are hydrogen and the basic side chain is in the 3-position.

References Cited
UNITED STATES PATENTS

| | | | |
|---|---|---|---|
| 2,732,373 | 1/1956 | Steiger | 260—279 |
| 2,732,374 | 1/1956 | Steiger | 260—279 |
| 2,891,957 | 6/1959 | Allen et al. | 260—240TCX |

JOHN D. RANDOLPH, Primary Examiner

U.S. Cl. X.R.

424—244, 248, 250, 267, 274, 275, 285; 260—328, 335

UNITED STATES PATENT OFFICE
CERTIFICATE OF CORRECTION

Patent No. 3,597,420 (S.N. 799,915) Dated August 3, 1971

Inventor(s) Sydney Archer

It is certified that error appears in the above-identified patent and that said Letters Patent are hereby corrected as shown below:

Column 1, line 25, "698,339" should read --698,399--.

Column 13, insert the following at line 18: --1-(2-diethylaminoethoxy)-9-xanthenone,--; line 61, this line should appear between lines 56 and 57; insert the following at line 64: --3-(2-diethylaminoethoxy)-7-ethylthio-9-benzyl-9-xanthenol--; line 68, "31(2-" should read --3-(2- --.

Column 18, line 57, "benbenzylidene)" should read --benzylidene)--.

Column 22, line 19, "9-benzylidenethioxanthene," should read --9-benzyl-9-thioxanthenol,--; line 61, "81" should read --8- --.

Column 26, line 9, "...menzyli-" should read --...benzyli- --; line 40, "8-methyl-" should read --2-methyl- --.

Column 27, line 16, "8-methylpropoxy)" should read --2-methylpropoxy)--; line 36, "-(p-" should read -- -9-(p- --.

Column 31, line 14, Claim 4; line 17, Claim 5; line 21, Claim 6, "benzyliden", each occurrence, should read --benzylidene--.

Column 32, line 3, Claim 7; line 6, Claim 8, "benzyliden", each occurrence, should read --benzylidene--.

Signed and sealed this 1st day of May 1973.

(SEAL)
Attest:

EDWARD M. FLETCHER, JR.
Attesting Officer

ROBERT GOTTSCHALK
Commissioner of Patents